US008026837B1

(12) United States Patent  (10) Patent No.: US 8,026,837 B1
Valley et al.  (45) Date of Patent: Sep. 27, 2011

(54) SYSTEMS AND METHODS FOR CONVERTING WIDEBAND SIGNALS IN THE OPTICAL DOMAIN

(75) Inventors: George C. Valley, Los Angeles, CA (US); George A. Sefler, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 12/765,721

(22) Filed: Apr. 22, 2010

(51) Int. Cl.
 *H03M 1/00* (2006.01)
(52) U.S. Cl. ......................................... 341/137; 341/155
(58) Field of Classification Search .................. 341/137, 341/155
See application file for complete search history.

(56) References Cited

U.S. PATENT DOCUMENTS

| | | | | |
|---|---|---|---|---|
| 6,326,910 | B1 * | 12/2001 | Hayduk et al. | 341/137 |
| 6,404,366 | B1 * | 6/2002 | Clark et al. | 341/137 |
| 7,321,731 | B2 * | 1/2008 | Ionov et al. | 398/75 |
| 2010/0201345 | A1 * | 8/2010 | Gupta et al. | 324/96 |

OTHER PUBLICATIONS

Bortnik et al., *Predistortion technique for RF-photonic generation of high-power ultrawideband arbitrary waveforms*, J. Lightwave Technology, vol. 24, No. 7, 2752-2759 (Jul. 2006).
Candes et al. *Near Optimal Signal Recovery From Random Projections: Universal Encoding Strategies?*, IEEE Trans. on Information Theory, vol. 52, No. 12, 5406-5425 (Dec. 2006) Submitted Oct. 2004, Revised Mar. 2006.
Candes et al., *An Introduction to Compressive Sampling [A sensing/sampling paradigm that goes against the common knowledge in data acquistion]*, IEEE Signal Processing Magazine, vol. 25 No. 2, (Mar. 21-30 2008).
Chou et al., *Adaptive RF-Photonic Arbitrary Waveform Generator*, IEEE Photonics Technology Letters, vol. 15, No. 4, 581-583 (Apr. 2003).
Chou et al., *Photonic bandwidth compression front end for digital oscilloscopes*, submitted to J. Lightwave Technology, vol. 27, No. 22, 5073-5077 (Nov. 15, 2009).
Donoho, David, *Compressed Sensing*, IEEE Trans. on Information Theory, vol. 52, No. 4, 1289-1306 (Apr. 2006) published online Sep. 14, 2004.
Gupta et al., *Power scaling in time stretch analog-to-digital converters*, Proceedings of Avionics, Fiber-Optics and Phototonics and Photonics Technology Conference, AVFOP '09. IEEE, pp. 5-6 (Sep. 22-24, 2009).
Lee et al., *Extreme Chirped Pulse Oscillator (XCPO) Using a Theta Cavity Design*, IEEE Photonics Technology Letters, vol. 18, No. 7, 799-801 (Apr. 1, 2006).

(Continued)

*Primary Examiner* — Khai M Nguyen
(74) *Attorney, Agent, or Firm* — Jones Day

(57) ABSTRACT

Systems and methods for converting wideband signals in the optical domain are provided. A device for obtaining a digital representation of a received signal may include a spatially dispersive element that may be configured to spatially disperse frequencies in an optical-domain representation of the received signal; a spatial light modulator that may be configured to mix the dispersed optical frequencies by imposing a mixing matrix on an optical intensity of the dispersed optical frequencies; an optical sensor that may be configured to obtain an electrical representation of the mixed dispersed optical frequencies; and a signal recovery processor that may be configured to obtain a digital representation of the received signal based on the electrical representation and the mixing matrix. The signal recovery processor may be further configured to determine a modulation format of the digital representation and may demodulate the digital representation based on the modulation format.

20 Claims, 18 Drawing Sheets

OTHER PUBLICATIONS

Lee et al., *33 MHz. Repetition Rate Semiconductor Mode-Locked Laser Using eXtreme Chirped Pulse Oscillator*, in Conference on Lasers and Electro-Optics/Quantum Electronics and Laser Science Conference and Photonic Applications Systems Technologies, OSA Technical Digest (CD), 2 pages (Optical Society of America, 2008), paper CTuU7.

Loris, Ignace, *L1 Packv2: A Mathematica package for minimizing an l1-penalized functional,*. 1-17 (Aug. 20, 2008) available at http://adsabs.harvard.edu/abs/2008CoPhC.179..895L.

Mishali et al., *From Theory to Practice. Sub-Nyquist Sampling of Sparse Wideband Analog Signals*, pp. 1-17 (Nov. 10, 2009), available at http://arxiv.org/abs/0902.4291v3.

Sefler et al, *Holographic Multichannel Radio-Frequency Correlator*, Optical Engineering, vol. 39 No. 1, 260-266 (Jan. 2000).

Sefler et al., *Wide Bandwidth, High Resolution TimeStretch ADC Scalable to Continuous-Time Operation*, Proceedings of Conference on Lasers and Electro-Optics, 2009 and 2009 Conference on Quantum electronics and Laser Science Conference, CLEO/QELS 2009, pp. 1-2 (Jun. 2-4, 2009).

Tropp et al., *Beyond Nyquist: Efficient Sampling of Sparse Bandlimited Signals*, IEEE Transactions on Information Theory, vol. 56, No. 1, 520-544 (Jan. 2010).

Valley, G. C., *Photonic Analog to Digital Converters*, Optics Express, vol. 15 Issue 5, pp. 1955-1982 (Mar. 5, 2007).

Walden, R.H., *Analog-to-digital conversion in the early 21st century*, in wiley Encyclopedia of Computer Science and Engineering, (edited by Benjamin Wah) Hoboken: John Wiley & Sons, Inc., pp. 1-14 (Sep. 9, 2008).

Xiao et al., *Programmable Photonic Microwave Filters With Arbitrary Ultra-Wideband Phase Response*, IEEE Trans. Microwave Theory and Technique, vol. 54, No. 11, 4002-4008 (Nov. 2006).

* cited by examiner

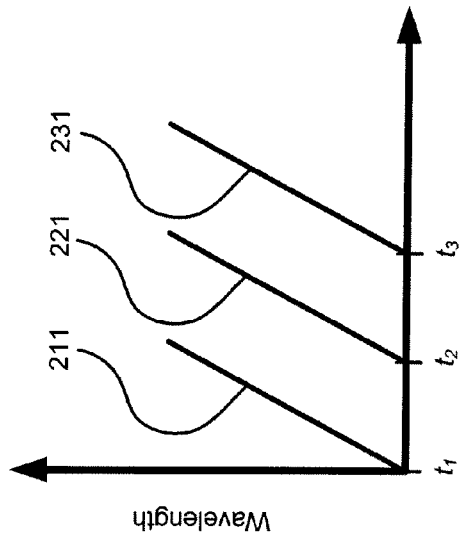
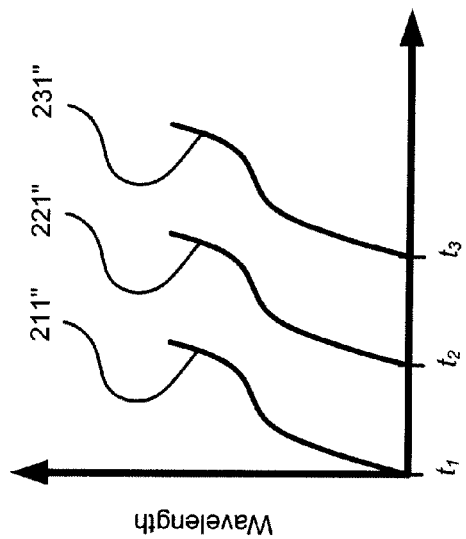
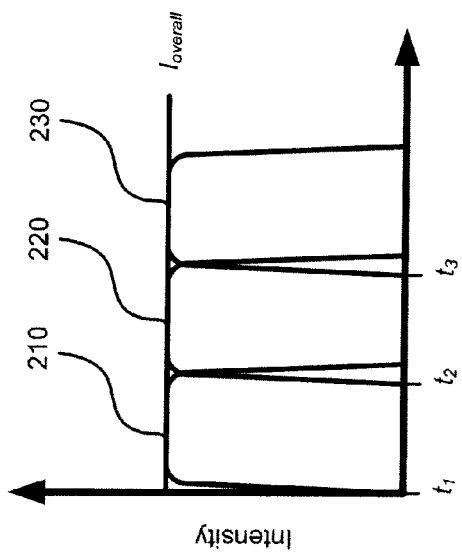
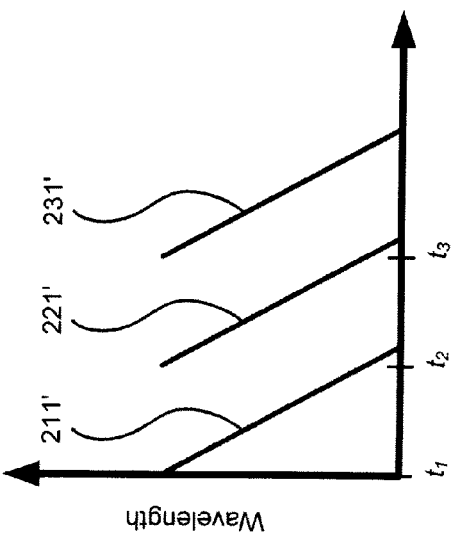

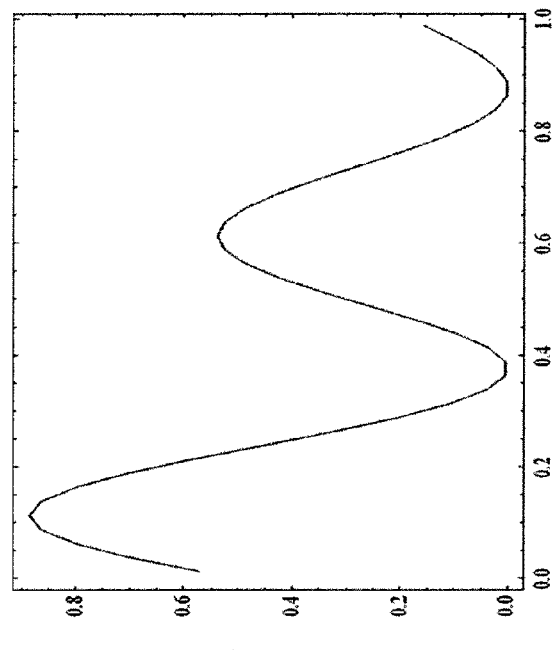
FIG. 15C
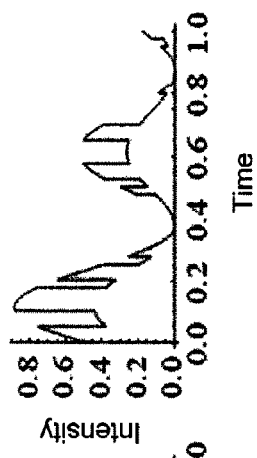
FIG. 15A
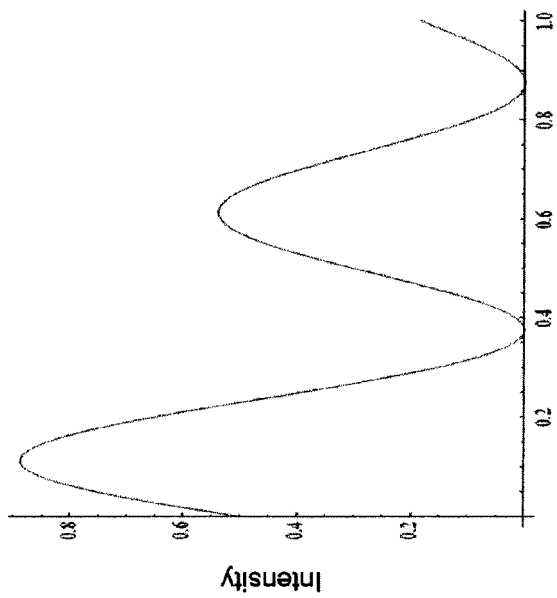
M = 3
FIG. 15B
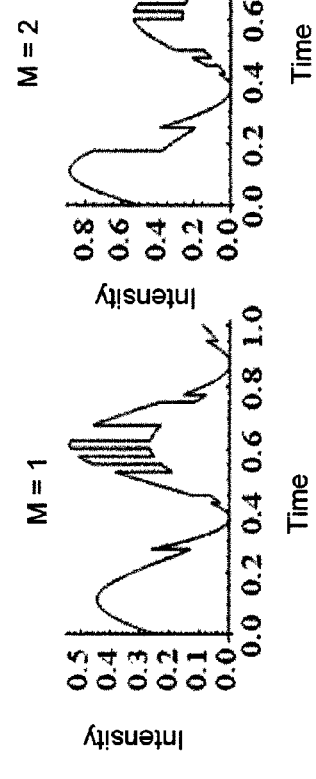
M = 2
M = 1

SYSTEMS AND METHODS FOR CONVERTING WIDEBAND SIGNALS IN THE OPTICAL DOMAIN

STATEMENT OF GOVERNMENT INTEREST

This invention was made with Government support under Contract No. FA88002-09-C-0001 awarded by the Department of the Air Force. The Government has certain rights in the invention.

FIELD OF THE INVENTION

This application generally relates to systems and methods for converting wideband signals.

BACKGROUND OF THE INVENTION

An analog-to-digital converter (ADC) is a device that converts continuous analog signals to discrete digital numbers. Generally, an ADC samples an input signal at a predetermined sampling rate calculated using the Nyquist-Shannon Sampling Theorem. Under that theorem, perfect reconstruction of a continuous time signal may be obtained if the sampling rate is greater than twice the highest frequency of the signal. Sampling at twice the highest frequency may, however, not be possible, especially for wideband signals or the resolution (number of bits) obtained at this rate may not be sufficient. A wideband signal may be defined as a signal operating at a wide range of frequencies, e.g., above 1 GHz. For these reasons, previously-known ADCs may be inadequate to handle wideband applications in, for example, electronic warfare, radar, cognitive radio, signals intelligence, telecommunications, and signal sampling in space. Moreover, previously-known ADCs rely on high-speed, high-power electronics that may be cumbersome, power-hungry, and expensive.

SUMMARY OF THE INVENTION

Embodiments of the present invention provide systems and methods for converting wideband signals using optical-domain processing. Specifically, a received signal, e.g., a wideband signal, may be modulated in the optical domain so as to convert the received signal into a digital signal using, for example, commercially available, low cost, low data rate, low power analog-to-digital converters (ADCs).

In accordance with one aspect of the invention, a device for obtaining a digital representation of a received signal includes a spatially dispersive element that may be configured to spatially disperse optical frequencies in an optical-domain representation of the received signal; a spatial light modulator that may be configured to mix the dispersed optical frequencies by imposing a mixing matrix on an optical intensity of the dispersed optical frequencies; an optical sensor that may be configured to obtain an electrical representation of the mixed dispersed optical frequencies; and a signal recovery processor that may be configured to obtain a digital representation of the received signal based on the electrical representation and the mixing matrix.

In some embodiments, the signal recovery processor may be further configured to determine a modulation format of the digital representation and may demodulate the digital representation based on the modulation format.

In some embodiments, the received signal includes an optical digital signal. In some embodiments, the received signal includes an analog or digital signal. In some embodiments, the received signal includes a radio-frequency (RF) signal.

Some embodiments further include a chirped optical source that may be configured to generate a chirped repetitively pulsed optical signal and an optical modulator that may be configured to impose the analog RF signal on the chirped repetitively pulsed optical signal.

In some embodiments, the chirped optical source includes a laser and/or a dispersive optical element, such as a chirped fiber Bragg grating or a segment of dispersion-compensation fiber.

Some embodiments further include an analog signal receiver that may be configured to receive the analog radio-frequency signal.

In some embodiments, the optical modulator may be an intensity modulator. In other embodiments, the device further includes a splitter, and the optical modulator may be a phase modulator and the chirped repetitively pulsed optical signal may be divided into a first portion and a second portion. The first portion may travel to the phase modulator and the second portion may travel to the splitter. The splitter may be configured to split the second portion of the chirped repetitively pulsed optical signal based on the mixing matrix and transmit the split second portion of the chirped repetitively pulsed optical signal to interfere with the mixed dispersed optical frequencies of the first portion of the chirped repetitively pulsed optical signal from the spatial light modulator.

In some embodiments, the spatially dispersive element includes a diffraction grating.

In some embodiments, the spatially dispersive element includes a wavelength division demultiplexer.

In some embodiments, the spatial light modulator may be a partially transmissive optic that contains a fixed array of different transmission coefficients.

In some embodiments, the spatial light modulator may include channels and columns of pixels, each pixel being independently adjustable.

In some embodiments, the optical sensor may include an array of photodiodes. The photodiodes may include a low-pass filter.

In some embodiments, the signal recovery processor includes an analog-to-digital converter.

Some embodiments further include a display unit that may display the digital representation of the received signal.

In accordance with another aspect of the invention, a method for obtaining a digital representation of a received signal includes obtaining an optical-domain representation of the received signal; spatially dispersing optical frequencies in the optical-domain representation; mixing the dispersed optical frequencies by imposing a mixing matrix on an optical intensity of the dispersed optical frequencies; obtaining an electrical representation of the mixed dispersed optical frequencies; and obtaining a digital representation of the signal based on the electrical representation and the mixing matrix.

Some embodiments further include determining a modulation format of the digital representation and may include demodulating the digital representation based on the modulation format.

In some embodiments, receiving the signal includes receiving an optical digital and/or radio-frequency signal.

In some embodiments, receiving the signal includes generating a chirped repetitively pulsed optical signal and modulating the chirped repetitively pulsed optical signal by imposing an analog signal on the chirped repetitively pulsed optical signal.

In some embodiments, generating a chirped repetitively pulsed optical signal includes generating a chirped repetitively pulsed optical signal with a laser.

In some embodiments, generating a chirped repetitively pulsed optical signal includes generating a chirped repetitively pulsed optical signal by dispersing a femtosecond (fs) class laser pulse with a dispersive optical component. The femtosecond class laser pulse may be in the range of 1 fs to 1000 fs at full-width half-maximum (FWHM), and may be within 10 fs to 100 fs FWHM.

In some embodiments, spatially dispersing frequencies includes spatially dispersing the frequencies with a diffraction grating.

In some embodiments, mixing the dispersed optical frequencies includes mixing the dispersed optical frequencies with a spatial light modulator.

In some embodiments, obtaining an electrical representation includes obtaining an electrical representation with an array of photodiodes.

In some embodiments, obtaining a digital representation includes converting the electrical representation from an analog representation to a digital representation.

In some embodiments, obtaining the digital representation includes recovering the signal based on the digital representation and the mixing matrix.

Some embodiments further include displaying the digital representation of the signal.

BRIEF DESCRIPTION OF THE DRAWINGS

FIG. 2A is a plot illustrating the temporal variations in intensity of three exemplary chirped repetitively pulsed optical signals that may be generated by a chirped optical source.

FIGS. 2B-2D are plots illustrating temporal variations in wavelength of three exemplary chirped repetitively pulsed optical signals that may be generated by a chirped optical source, e.g., the temporal wavelength variations of the three chirped repetitively pulsed optical signals illustrated in FIG. 2A.

FIG. 15A is a plot illustrating the intensity of an exemplary analog radio-frequency signal as input to the device.

FIG. 15B is three plots illustrating the intensity of three optical signals over normalized time after transmission through separate channels of a mixing matrix.

FIG. 15C is a plot illustrating the digital representation of the analog signal of FIG. 15A as digitized by the device using low rate ADCs.

DETAILED DESCRIPTION

Embodiments of the present invention include systems and methods for obtaining a digital representation of a received signal, e.g., a digital or analog radio-frequency (RF) signal, or an optical digital signal, using optical-domain processing. First, different frequencies of an optical-domain representation of the received signal may be spatially dispersed so as to produce a time/wavelength to space mapping of the signal, which prepares the optical frequencies for mixing. The dispersed optical frequencies of the optical-domain representation then may be mixed in the optical domain by imposing a mixing matrix on an optical intensity of the dispersed optical frequencies, for example by varying the transmitted intensities and/or phases of different portions of the dispersed optical frequencies using a spatial light modulator (SLM). A digital representation of the received signal may then be obtained from the mixed frequencies using optical sensors coupled to a suitable signal recovery processor, e.g., as described in greater detail herein.

Previously-known signal processing techniques rely solely on high-speed, high power electronics to obtain a digital representation of a signal. In accordance with the principles of the present invention, a spatial light modulator is used to impose a mixing matrix on the optical intensities of dispersed optical frequencies of an optical-domain representation of an analog or digital signal, thereby enabling the received signal to be converted into a digital signal using, for example, commercially available, low cost, low data rate, low power analog-to-digital converters (ADCs). The device disclosed herein may sample the received signal at a sampling rate at least M times greater than the sampling rate of a previously-known electronic ADC, where M is the number of channels in the spatial light modulator. This functionality may be especially important for converting wideband signals, e.g., signals operating at frequencies above 1 GHz, because previously-known ADCs may be inadequate to handle wideband applications in, for example, electronic warfare, radar, cognitive radio, signals intelligence, telecommunications, and signal sampling in space.

As described in greater detail below, the device further may be configured to determine the modulation format of the digital representation of the received signal after analog-to-digital conversion. Further still, the device may demodulate the digital representation based on the determined modulation format.

As discussed in greater detail herein, the received signal may be, for example, a radio-frequency signal, which may be an analog or digital signal, or may be an optical digital signal. Embodiments of the invention useful for obtaining digital representations of radio-frequency signals will first be described, and embodiments of the invention useful for obtaining digital representations of optical digital signals will then be described.

Radio-Frequency Signal

Figure 1:
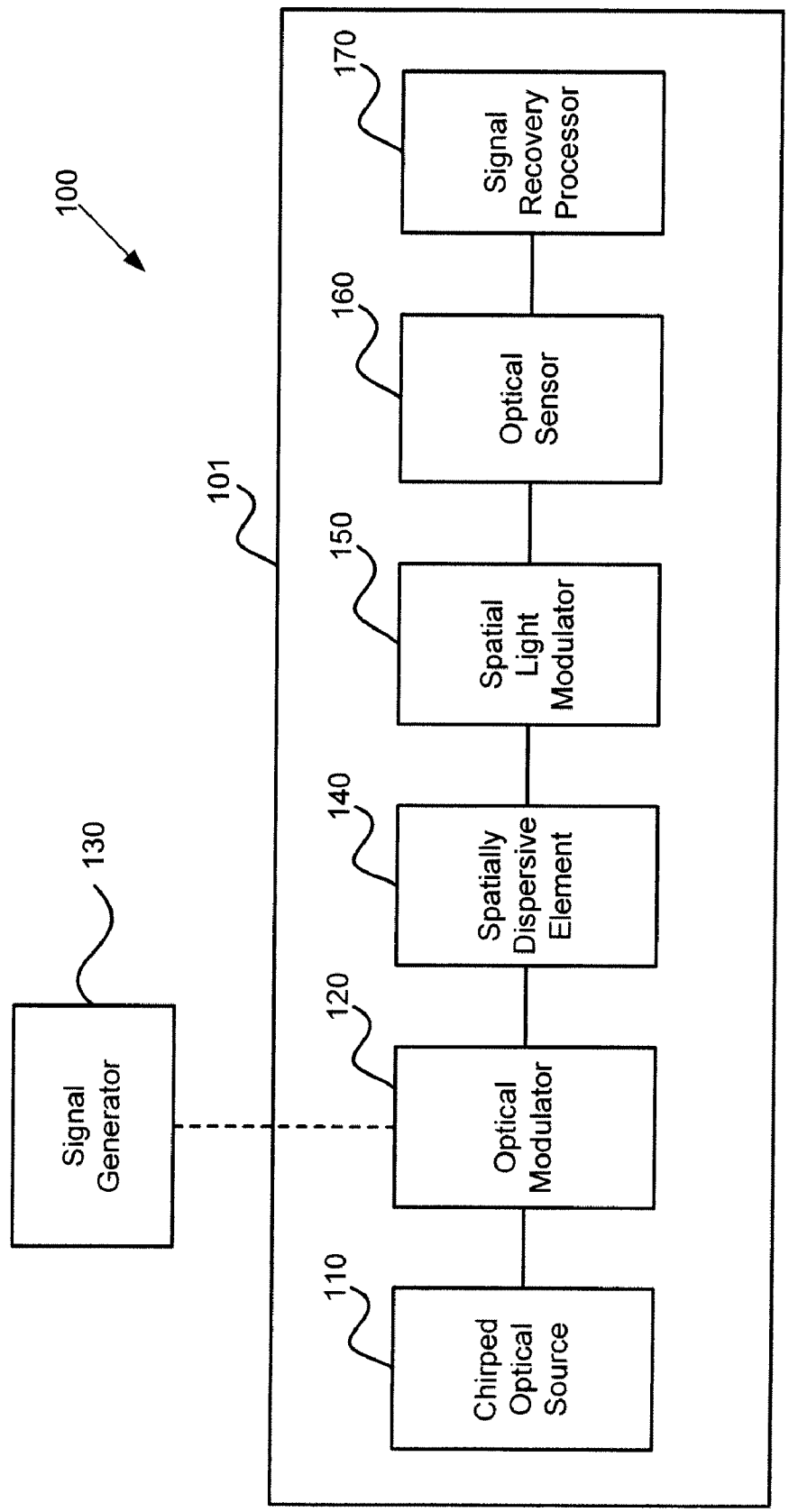
FIG. 1 schematically illustrates an exemplary device for obtaining a representation of a signal in the optical domain, according to some embodiments of the present invention.

FIG. 1 schematically illustrates exemplary device 100 for obtaining a digital representation of a received signal using optical-domain processing, according to some embodiments of the present invention. Device 100 includes chirped optical source 110, optical modulator 120, spatially dispersive element 140, spatial light modulator 150, optical sensor 160, and signal recovery processor 170. In some embodiments, device 100 includes housing 101 configured to hold at least chirped optical source 110, optical modulator 120, spatially dispersive element 140, spatial light modulator 150, optical sensor 160, and signal recovery processor 170 as illustrated in FIG. 1. In other embodiments, device 100 includes more than one housing (not shown), each housing configured to hold at least one structure in device 100.

Chirped optical source 110 may be configured to generate a chirped repetitively pulsed optical signal. A chirped repetitively pulsed optical signal is an optical pulse that has a relatively constant intensity as a function of time and has temporal wavelength variations. FIG. 2A is a plot illustrating the temporal variations in intensity of three exemplary chirped repetitively pulsed optical signals that may be generated by chirped optical source 110. The plurality of chirped repetitively pulsed optical signals has a substantially continuous overall intensity in time as represented by $I_{overall}$. Temporal intensity profiles 210, 220, 230 illustrate three chirped repetitively pulsed optical signals that begin at times $t_1$, $t_2$, $t_3$, respectively. Once a chirped repetitively pulsed optical signal begins, its intensity increases over time until the intensity levels off at a peak, e.g., at $I_{overall}$. The chirped repetitively pulsed optical signals may have substantially the same energy as one another and may overlap slightly in the temporal domain. For example, temporal intensity profile 210 begins to decrease after time $t_2$, when temporal intensity profile 220 begins. Temporal intensity profiles 210 and 220 overlap slightly after time $t_2$, after which temporal intensity profile 210 decreases to zero and temporal intensity profile 220 increases to $I_{overall}$.

FIG. 2B is a plot illustrating the temporal variations in wavelength of three exemplary linear, positively chirped repetitively pulsed optical signals that may be generated by chirped optical source 110, e.g., the temporal wavelength variations of the three chirped repetitively pulsed optical signals illustrated in FIG. 2A. Temporal wavelength profiles 211, 221, 231 illustrate three chirped repetitively pulsed optical signals that begin at times $t_1$, $t_2$, $t_3$, respectively, overlap slightly in the temporal domain, and have substantially uniform intensities. To generate temporal wavelength profiles 211, 221, 231, a grating, for example, may be arranged so that the short-wavelength component of the optical pulse travels a shorter path than does the long-wavelength component. After transmission through or reflection from the grating, the optical pulse becomes positively chirped, that is, the long-wavelength component lags behind the short-wavelength component in time.

FIG. 2C is a plot illustrating the temporal variations in wavelength of three exemplary linear, negatively chirped repetitively pulsed optical signals that may be generated by chirped optical source 110, e.g., the temporal wavelength variations of the three chirped repetitively pulsed optical signals illustrated in FIG. 2A. Temporal wavelength profiles 211', 221', 231' illustrate three chirped repetitively pulsed optical signals that begin at times $t_1$, $t_2$, $t_3$, respectively, overlap slightly in the temporal domain, and have substantially uniform intensities. To generate temporal wavelength profiles 211', 221', 231', a grating, for example, may be arranged so that the long-wavelength component of the optical pulse travels a shorter path than does the short-wavelength component. After transmission through or reflection from the grating, the optical pulse becomes negatively chirped, that is, the short-wavelength component lags behind the long-wavelength component in time.

FIG. 2D is a plot illustrating the temporal variations in wavelength of three exemplary nonlinear, positively chirped repetitively pulsed optical signals that may be generated by chirped optical source 110, e.g., the temporal wavelength variations of the three chirped repetitively pulsed optical signals illustrated in FIG. 2A. Temporal wavelength profiles 211", 221", 231" illustrate three chirped repetitively pulsed optical signals that begin at times $t_1$, $t_2$, $t_3$, respectively, overlap slightly in the temporal domain, and have substantially uniform intensities. When the chirped repetitively pulsed optical signal is nonlinear, the angle of diffraction from spatially dispersive element 140 (described further below) may be nonlinear. Still, device 100 may be used when chirped optical pulses are nonlinear if spatial light modulator 150 (described further below) has a high resolution to compensate for the nonlinear angle of diffraction.

As shown in FIG. 1, chirped optical source 110 may include, for example, any suitable laser, e.g., a mode-locked laser, fiber laser, titanium-doped sapphire (Ti:Sapphire) solid-state laser, or dye laser. In some embodiments, the laser may be configured so as to generate chirped repetitively pulsed optical signals without the need for an additional component. Alternatively, chirped optical source 110 may further include one or more optical components for dispersing and hence chirping a pulse generated by the laser. Such an optical component may include, for example, a grating such as a chirped fiber Bragg grating (FBG), a dispersion compensating fiber (DCF), or a standard optical fiber. The laser may be, for example, bandwidth-limited, so as to produce ultrafast pulses (e.g., 1 picosecond Full Width at Half Maximum (FWHM) or less) at a high bandwidth (e.g., 10 nm FWHM or more), and the dispersive optical component may be configured to temporally disperse the bandwidth of those pulses such that the pulses temporally overlap with one another, resulting in a substantially uniform overall intensity $I_{overall}$ as illustrated in FIG. 2A. The laser may have, for example, a repetition rate of 100 MHz, resulting in a period (time difference between $t_2$ and $t_1$, and between $t_3$ and $t_2$) of 10 ns. In some embodiments, a chirped repetitively pulsed optical signal is generated by dispersing a femtosecond (fs) class laser pulse with a dispersive optical component. The femtosecond class laser pulse may be in the range of 1 fs to 1000 fs full-width at half-maximum (FWHM), and may be within 10 fs to 100 fs FWHM.

In one illustrative embodiment, chirped optical source 110 may be a theta laser such as disclosed in Shinwook Lee et al., *Extreme Chirped Pulse Oscillator (XCPO) Using a Theta Cavity Design*, IEEE Photonics Technology Letters, Vol. 18, No. 7, 799-801 (Apr. 1, 2006), the entire contents of which are incorporated by reference herein. The theta laser disclosed in Lee includes two optical circulators, an intensity modulator, an output coupler, a bandpass filter, a polarization controller, a semiconductor optical amplifier, an electric comb generator, and chirped FBG. The theta laser may be used to generate a chirped optical pulse.

Signal generator 130 may generate a radio-frequency signal, e.g., an analog radio-frequency or digital radio-frequency signal. The characteristics of the radio-frequency signal may be unknown. Signal generator 130 may be any device capable of generating a radio-frequency signal and may be remote from device 100. For simplicity, generating an analog signal will be described below. The analog signal may be sparse under a known transformation, e.g., a Fourier or wavelet transform. In the frequency domain, a sparse signal is defined to be a signal that consists of a relatively small number of narrowband transmissions spread across a relatively wide spectrum range. A sparse signal may be represented by a vector, e.g., a vector having dimension N×1, having a relatively small number of nonzero elements.

After the analog signal is generated by signal generator 130, the analog signal is received by any structure capable of receiving an analog signal, e.g., an antenna (not shown). In some embodiments described further below, device 100 includes the analog signal receiver which may be disposed within optical modulator 120. In other embodiments, the analog signal receiver is disposed outside of device 100 and operatively coupled to device 100 such that the analog signal may be transmitted to optical modulator 120.

Figure 3:
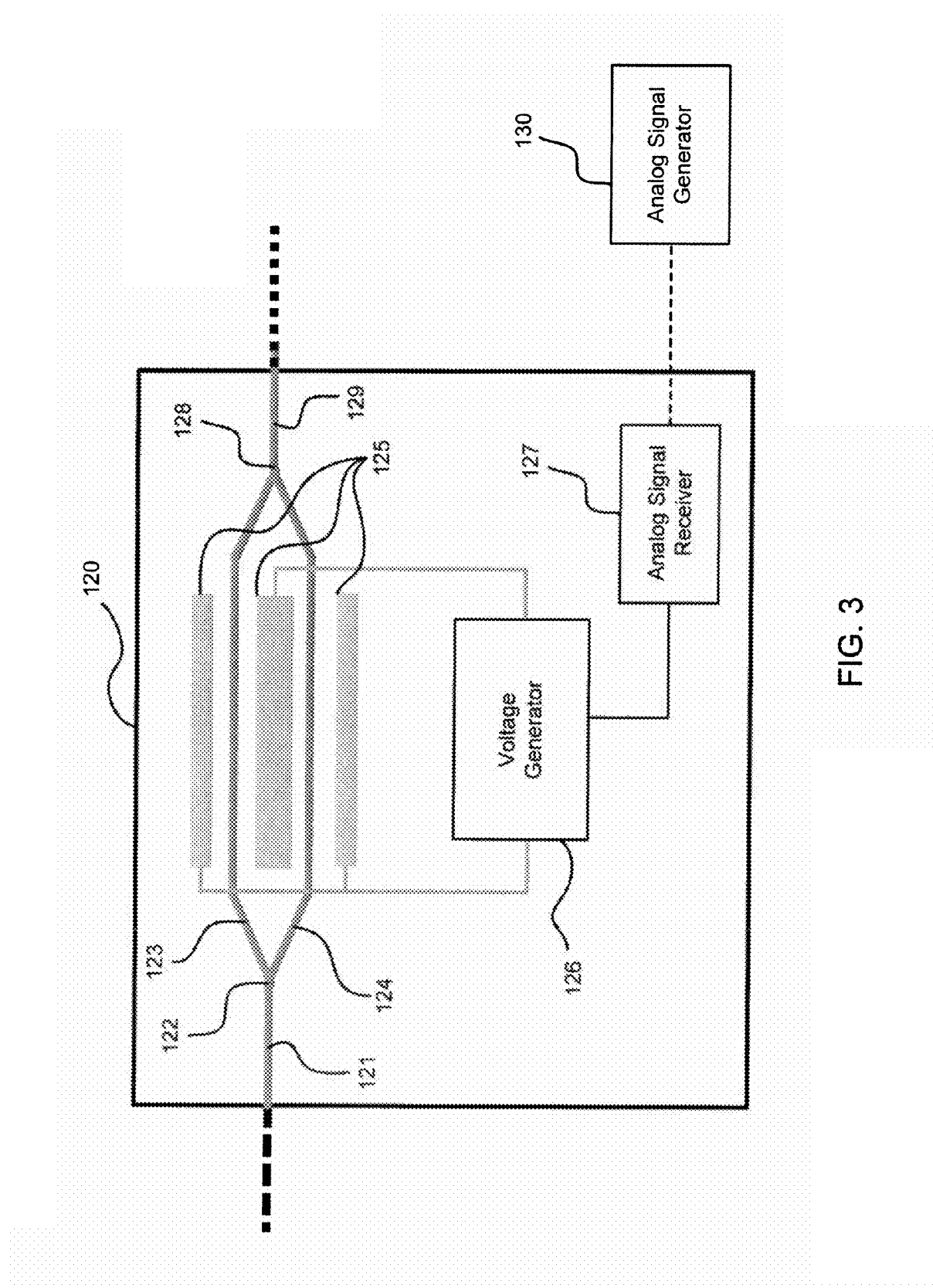
FIG. 3 schematically illustrates an exemplary optical modulator that is an intensity modulator configured to impose an analog signal on the chirped repetitively pulsed optical signal, according to some embodiments of the invention.

Optical modulator 120 may be configured to impose the RF analog signal on the chirped repetitively pulsed optical signal generated by chirped optical source 110. For example, FIG. 3 schematically illustrates an exemplary optical modulator 120 that is an intensity modulator configured to impose an RF analog signal on the intensity of the chirped repetitively pulsed optical signal, according to some embodiments of the invention. Optical modulator 120 illustrated in FIG. 3 includes input optical fiber 121, electrodes 125, voltage generator 126, analog signal receiver 127, and output optical fiber 129. A chirped repetitively pulsed optical signal from chirped optical source 110 is introduced to optical modulator 120 through input optical fiber 121. Junction 122 divides the chirped repetitively pulsed optical signal into two portions and respectively guides the portions into sections 123 and 124. Electrodes 125 are positioned on either side of sections 123, 124. Voltage generator 126 may be programmed to independently apply voltages to different pairs of electrodes 125 so as to change the phase of the chirped repetitively pulsed optical signal traveling through the section adjacent to that pair. For example, voltage generator 126 may apply voltages proportional to the analog signal generated by signal generator 130 and received by analog signal receiver 127. Analog signal receiver 127 may be operatively coupled to voltage generator 126 and may be any structure capable of receiving an analog signal, e.g., an antenna.

In optical modulator 120 illustrated in FIG. 3, the two portions of the chirped repetitively pulsed optical signal in sections 123, 124 may recombine at junction 128 where they interfere with one another. Because the relative phase of the chirped repetitively pulsed optical signal portions traveling through sections 123, 124 may be controlled via voltage generator 126, the intensity of the chirped repetitively pulsed optical signal at junction 128 may be modulated based on the analog signal. For example, if the portion of chirped repetitively pulsed optical signal in section 123 is phase delayed by an even multiple of $\pi$ relative to that in section 124, then the two portions of chirped repetitively pulsed optical signal will constructively interfere with each other, yielding maximum brightness. Or, for example, if the portion of the chirped repetitively pulsed optical signal in section 123 is phase delayed by an odd multiple of $\pi$ relative to that in section 124, then the two portions will completely interfere with each other, yielding minimal brightness. The output of optical modulator 120 is the analog signal imposed as an intensity modulation on the chirped repetitively pulsed optical signal, referred to as the modulated chirped repetitively pulsed optical signal. This output is coupled into a single output optical fiber 129. Configurations such as that illustrated in FIG. 3 may be referred to as a Mach-Zehnder modulator (MZM). Other modulators, such as absorptive modulators based on the Franz-Keldysh effect or the quantum confined Stark effect, or other interferometric modulators, may also suitably be used.

Figure 4:
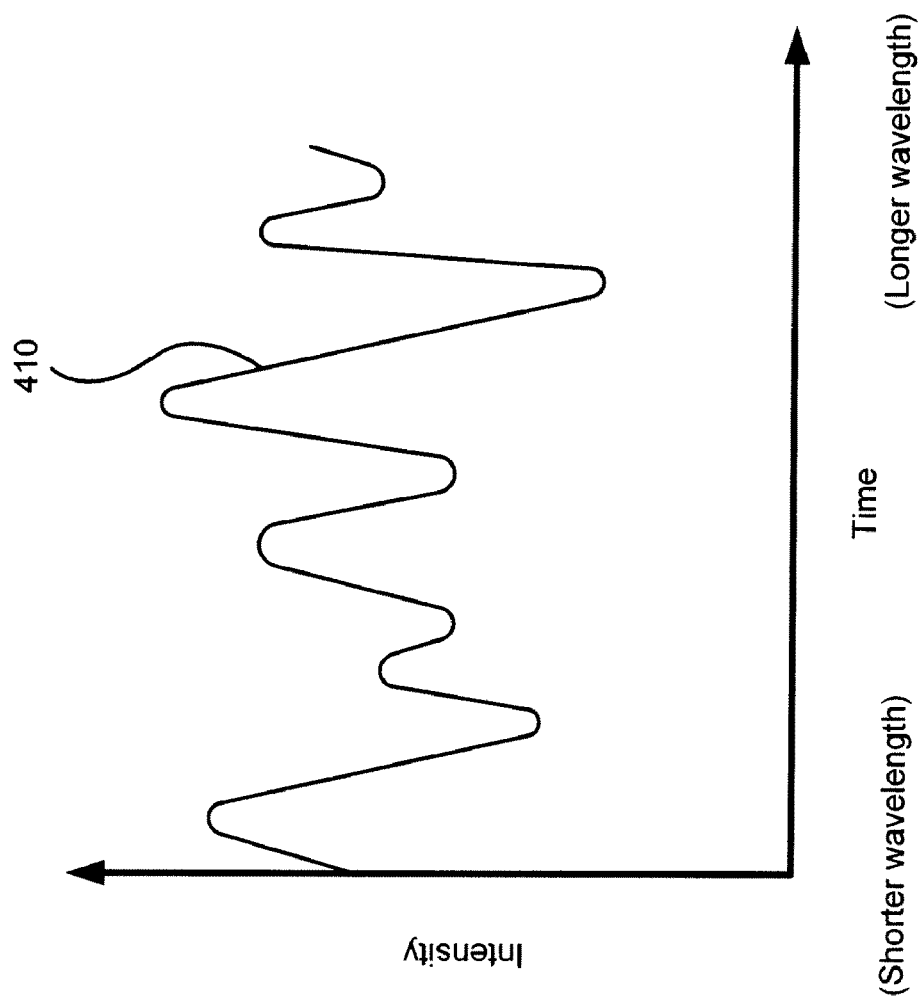
FIG. 4 is a plot illustrating a temporal intensity profile of an exemplary modulated chirped repetitively pulsed optical signal from an optical modulator.

FIG. 4 is a plot illustrating temporal intensity profile 410 of an exemplary modulated chirped repetitively pulsed optical signal from optical modulator 120. Temporal intensity profile 410 is modulated so as to have varying intensities throughout the chirped repetitively pulsed optical signal based on the imposed analog signal. In this example, the optical pulse is positively chirped, that is, the long-wavelength component lags behind the short-wavelength component in time.

Referring back to FIG. 1, spatially dispersive element 140 is configured to spatially disperse different optical frequencies in the modulated chirped repetitively pulsed optical signal from optical modulator 120. Spatially dispersive element 140 produces a time/wavelength to space mapping of the modulated chirped repetitively pulsed optical signal. The dispersive optical element, e.g., a chirped fiber Bragg grating or a segment of dispersion-compensation fiber, that may be included in optical source 110 may be engineered to complement spatially dispersive element 140 so as to provide a linear time/wavelength to space mapping. For example, the dispersive optical component may create timing errors on the optical pulse that are identical from pulse to pulse. If timing errors are detected, the spatially dispersive element may be calibrated to eliminate the timing errors using suitable techniques known in the art. Non-limiting examples of spatially dispersive element 140 include diffraction grating, e.g., transmission grating or reflection grating, a wavelength division demultiplexing (WDM) device, and a prism.

Figure 5:
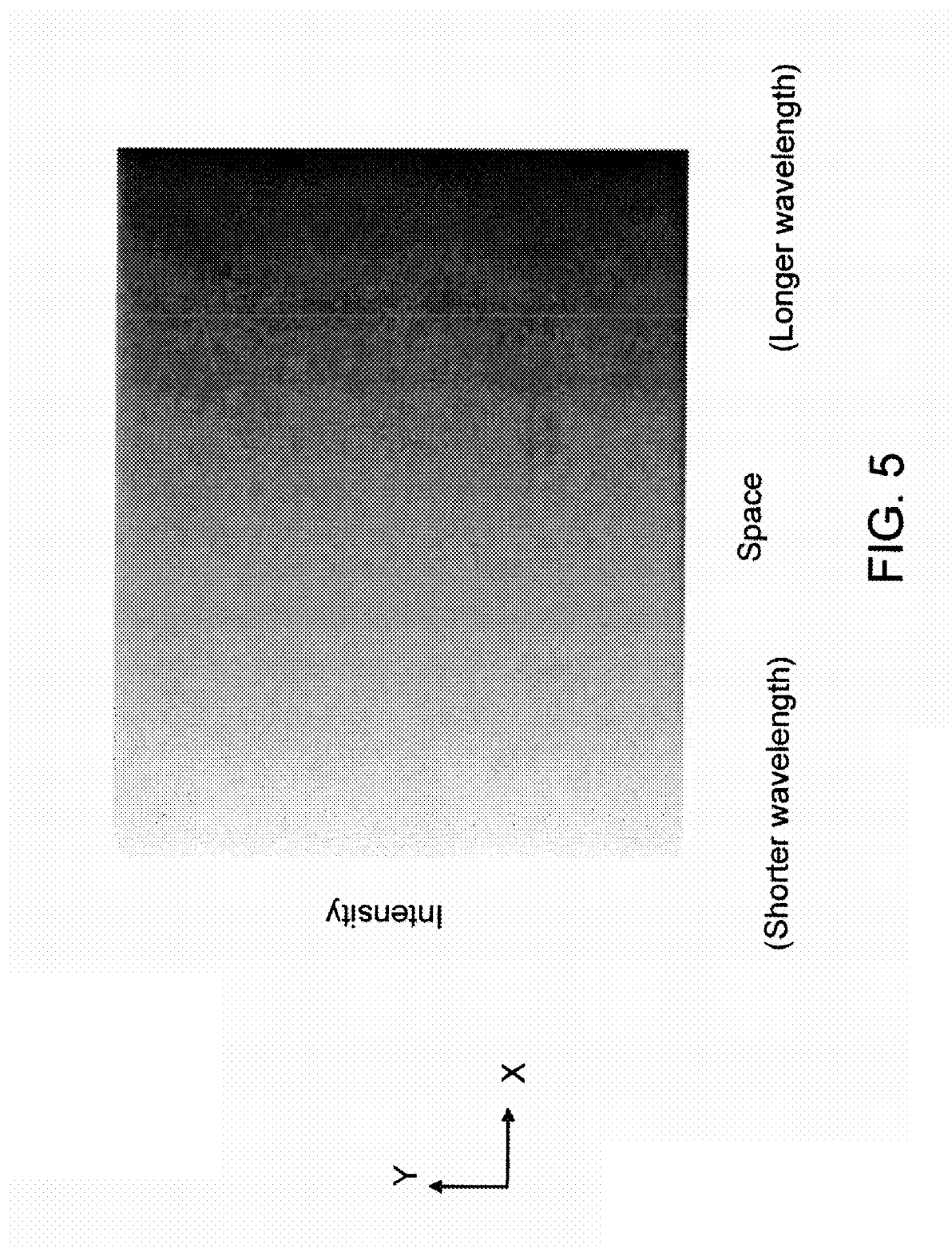
FIG. 5 illustrates exemplary dispersed optical frequencies in a modulated chirped repetitively pulsed optical signal from a spatially dispersive element.

FIG. 5 illustrates an exemplary arrangement of dispersed optical frequencies in a modulated chirped repetitively pulsed optical signal that is dispersed by spatially dispersive element 140. The frequencies are dispersed such that shorter wavelength frequencies, represented by light gray, are disposed on one end of the modulated chirped repetitively pulsed optical signal relative to the x-axis, and the wavelength of the frequencies increases along the x-axis up to longer wavelength frequencies, represented by dark gray. The wavelength of the modulated chirped repetitively pulsed optical signal remains uniform relative to the y-axis.

Figures 6A, 6B:
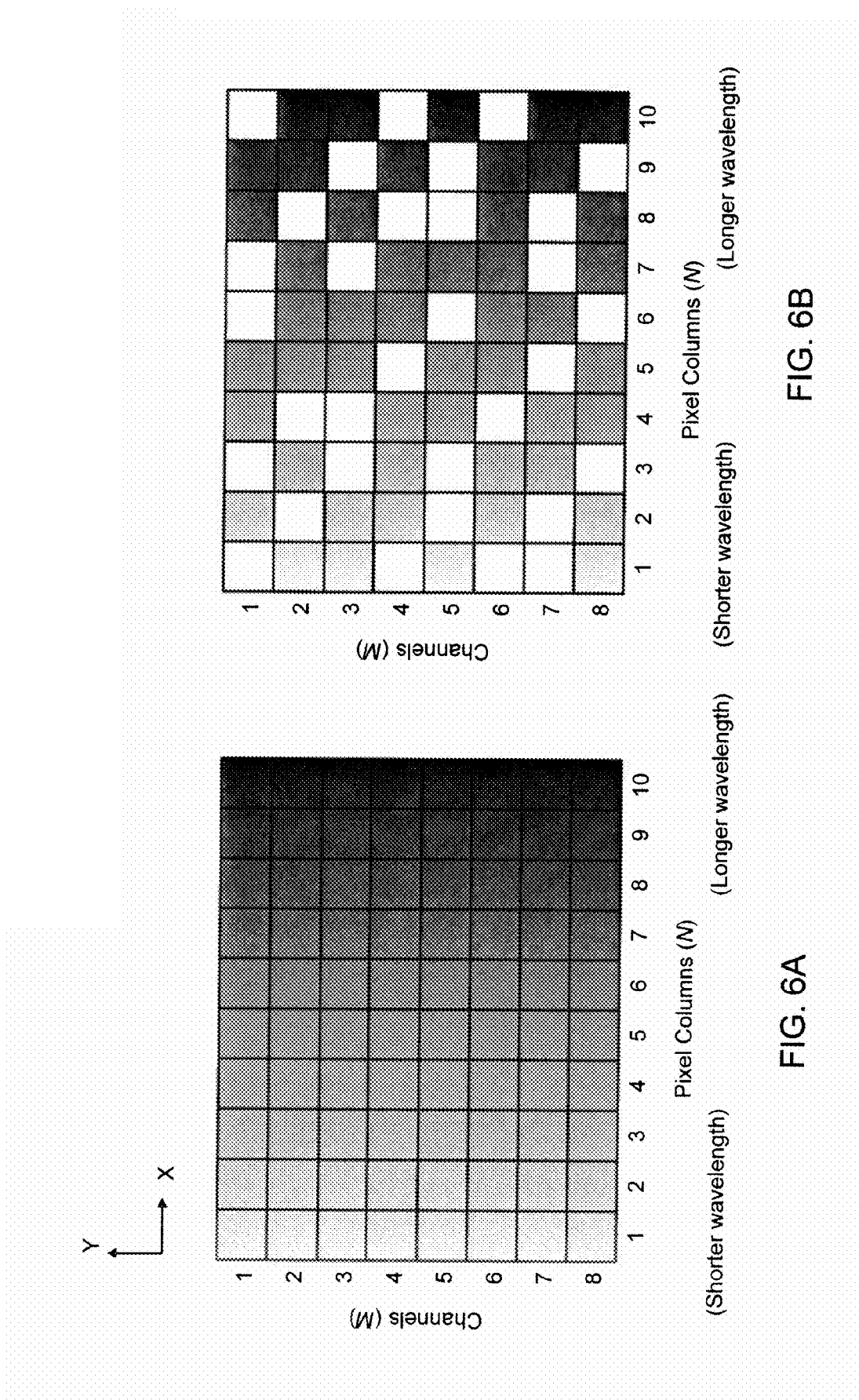
FIG. 6A illustrates the exemplary dispersed optical frequencies from FIG. 5 imposed on a grid of M channels by N pixel columns.
FIG. 6B illustrates the exemplary dispersed optical frequencies from FIG. 6A after imposing a mixing matrix on an optical intensity of the frequencies using a grid of M channels by N pixel columns.

Referring back to FIG. 1, spatial light modulator 150 may be configured to receive the dispersed optical frequencies from spatially dispersive element 140, and to impose a mixing matrix on an optical intensity of the dispersed optical frequencies. Spatial light modulator 150 may be a device that imposes some form of spatially-varying modulation, e.g., a phase or intensity modulation, on different portions of a beam of light. FIG. 6A illustrates the exemplary dispersed optical frequencies from FIG. 5 imposed on a grid of M channels by N pixel columns. In this example, there are eight channels and ten columns of pixels resulting in 80 pixels, and the longer wavelength portions are dispersed at the higher pixel column numbers. Each channel (M) receives frequencies with varying wavelengths, e.g., from shorter wavelengths to longer wavelengths. The number of channels (M) may be selected for wideband applications, and may include 1000 channels or more. Each pixel column (N) receives frequencies with wavelengths that do not vary greatly, e.g., pixel column 1 receives only short wavelength frequencies. Each pixel column (N) has M pixels that may be independently controlled by a computer-operated electronic driver which manipulates the pixel voltage, allowing the pixel voltage to be easily programmed and/or reprogrammed.

Spatial light modulator 150 mixes the dispersed optical frequencies by imposing a mixing matrix on an optical intensity of the dispersed optical frequencies. Specifically, spatial light modulator 150 may impose the mixing matrix by reducing or preventing selected light transmission of the dispersed optical frequencies by applying voltages to the individual pixels. Spatial light modulator 150 may be programmed to randomly prevent or reduce light transmission through certain pixels while never completely preventing light transmission of an entire pixel column (N). Spatial light modulator 150 may be programmed to prevent or reduce light transmission through the pixels by applying an appropriately chosen light transmission reduction coefficient between 0 and 1 to each of the selected pixels.

FIG. 6B illustrates the exemplary dispersed optical frequencies from FIG. 5 after spatial light modulator 150 imposes upon them a mixing matrix using the grid of M channels by N pixel columns illustrated in FIG. 6A. The white boxes represent pixels that completely or partially block light transmission of the dispersed optical frequencies, while the darker boxes represent pixels through which the dispersed optical frequencies are allowed to partially or substantially completely transmit. In the illustrated example, light transmission is completely blocked in the white boxes, meaning the chosen light transmission reduction coefficient is 0. In many embodiments, no column of pixels (N) is completely blocked by the mixing matrix, so that the mixed dispersed optical frequencies in FIG. 6B provide a useful representation of the dispersed optical frequencies in FIG. 5. In many embodiments, no row of the mixing matrix is identical to any other row of the mixing matrix.

Referring back to FIG. 1, spatial light modulator 150 may mix signals up to the maximum response Effective Input Bandwidth (EIB) for optical modulator 120. Currently, optical modulators may modulate signals with an EIB up to approximately 100 GHz. As the maximum response for optical modulators increases in the future, the EIB of a signal that may be mixed by spatial light modulator 150 would increase.

Spatial light modulator 150 may be, for example, a fixed mask, a partially transmissive optic, or a programmable device such as a liquid crystal display (LCD) or a digital micro-mirror device (DMD). The partially transmissive optic, e.g., transparency, plastic, and/or glass, may contain a fixed array of different transmission coefficients, e.g., via printing the transmission coefficients on the optic. The SLM may be configured, for example, so as to have a size of M Channels×N Pixel Columns. In one embodiment, the pixels of the SLM vary the intensity of light transmitted therethrough. In one embodiment, the pixels of the SLM vary the intensity of the light reflected therefrom.

Referring again to FIG. 1, optical sensor 160 may be configured to obtain an electrical representation of the mixed dispersed optical frequencies. The mixed dispersed optical frequencies from spatial light modulator 150 may be transmitted, e.g., via a second spatially dispersive element such as a lens, a grating, or an Arrayed Waveguide Grating (AWG) (not shown), onto optical sensor 160. Such an operation may be considered to be equivalent to multiplying the mixing matrix by the analog signal vector, resulting in a singular dot product. For example, a mixing matrix of dimension M×N may be multiplied by an analog signal of dimension N×1, resulting in a singular dot product of dimension M×1 that is received by optical sensor 160. Optical sensor 160 then integrates the mixed dispersed optical frequencies in time to obtain an electrical representation of the mixed dispersed optical frequencies. Optical sensor 160 may be any device capable of converting light into current. Optical sensor 160 may be an inherently low-pass filter device. In some embodiments, optical sensor 160 includes at least one photodiode. In some embodiments, optical sensor includes a linear photodiode array matched to spatial light modulator 150 such that a focusing output grating and/or lens are not necessary.

Figure 7:
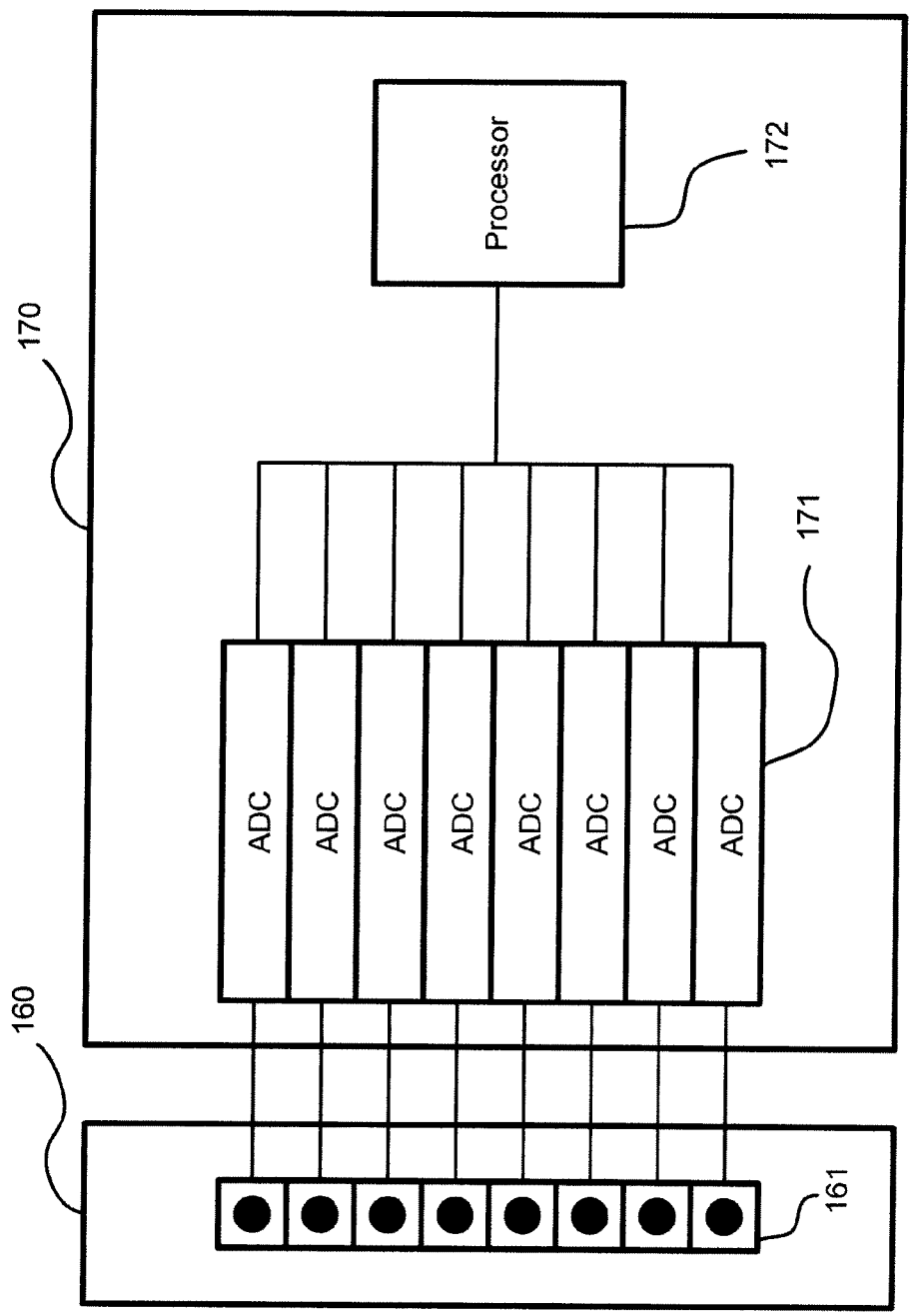
FIG. 7 illustrates an exemplary optical sensor and an exemplary signal recovery processor.

FIG. 7 illustrates an exemplary optical sensor 160 and an exemplary signal recovery processor 170. Optical sensor 160 includes linear photodiode array 161 that includes M photodiodes, where M is equal to the number of channels (M) in spatial light modulator 150. In this example, there are eight channels in spatial light modulator 150 and thus, there are eight photodiodes in linear photodiode array 161. The mixed dispersed optical frequencies from a channel (M) of spatial light modulator 150 are focused onto a corresponding element of linear photodiode array 161. For example, the mixed dispersed optical frequencies from Channel 1 of spatial light modulator 150 are focused onto Photodiode 1 of linear photodiode array 161. Linear photodiode array 161 then integrates the mixed dispersed optical frequencies as a function of time, e.g., so as to provide a vector of mixed dispersed optical frequencies having dimension M×1, thus providing an electrical representation of the mixed dispersed optical frequencies.

Referring back to FIG. 1, signal recovery processor 170 may be configured to obtain a digital representation of the analog signal based on the electrical representation obtained by optical sensor and further based on the mixing matrix. Signal recovery processor 170 may include any suitable device capable of converting analog signals into digital signals, e.g., an ADC. Additionally, signal recovery processor 170 may include any suitable device capable of signal recovery, e.g., a processor, and may include a memory device for storing the digital signals and/or the recovered signal. Signal recovery processor 170 receives an analog electrical representation of the mixed dispersed optical frequencies from optical sensor 160, and converts this analog electrical representation into a digital representation of the mixed dispersed optical frequencies at a suitable sample rate. Signal recovery processor 170 then obtains a digital representation of the originally received signal based on the digital representation of the mixed dispersed optical frequencies and on the mixing matrix. For example, if the mixing matrix is a square (M=N), signal recovery processor 170 may obtain the digital representation of the originally received signal by performing an operation that may be considered to be equivalent to multiplying the singular dot product from optical sensor 160 by the inverse of the mixing matrix. For example, a singular dot product of dimension M×1 (e.g., the electrical signal produced by the optical sensor) may be multiplied by the inverse of a mixing matrix of dimension $[M \times M]^{-1}$, resulting in a digital representation of the received signal, having dimension M×1.

Alternatively, if the mixing matrix is non-square (M≠N), signal recovery processor 170 instead may obtain the representation of the received signal through techniques known in the art of compressive sensing, e.g., using suitable computer software. As will be familiar to those of ordinary skill in the art, compressive sensing is a methodology for preprocessing sparse data in the analog domain, e.g., an analog signal, prior to digitization in such a way that fewer digital resources, e.g., fewer ADCs, are required to obtain an accurate representation of the sparse data. See, for example, Candès et al., *An Introduction To Compressive Sampling*, IEEE Signal Processing Magazine, Vol. 25 No. 2, 21-30 (March 2008), the entire contents of which are incorporated by reference herein.

In some embodiments, the compressive sensing techniques employed in the present invention may use a new set of algorithms developed for sampling signals and images at rates much lower than the traditional Nyquist rate. See, for example, Loris, *L1Packv2: A Mathematica package for minimizing an $l_1$-penalized functional*, pg. 1-17 (Aug. 20, 2008), the entire contents of which are incorporated by reference herein. Loris discloses the use in compressive sensing of a Mathematica® (Wolfram Research, Champaign, Ill.) package called L1 Packv2 that includes an algorithm called FindMinimizer that may be used to obtain a representation of the received signal. The L1 Packv2 package, or any other suitable set of algorithms, may be used to obtain a digital representation of the originally received signal based on the mixing matrix and the electronic representation obtained by optical sensor 160.

Signal recovery processor 170 may further determine the modulation format of the digital representation of the received signal, e.g., using suitable computer software. Non-limiting examples of analog modulation formats include amplitude modulation, double-sideband modulation, single-sideband modulation, vestigial sideband modulation, quadrature amplitude modulation, angle modulation, frequency modulation, pulse position modulation, and phase modulation.

Signal recovery processor 170 may demodulate the digital representation based on the determined modulation format, e.g., using suitable computer software. Signal recovery processor 170 may determine the modulation format and demodulate the determined modulation format after converting the electrical representation of the mixed dispersed optical frequencies from optical sensor 160 into a digital representation meaning device 100 may digitize the entire modulation format and then demodulate the digitized signal with, for example, suitable high speed digital demodulation software.

Signal recovery processor 170 illustrated in FIG. 7 includes linear ADC array 171 and processor 172. Linear ADC array 171 includes M ADCs, and in this example M equals eight. Each ADC is operatively coupled to a corresponding photodiode in linear photodiode array 161 such that each ADC receives the corresponding electrical representation of the mixed dispersed optical frequencies. Each ADC converts the received electrical representation from an analog representation to a digital representation. The digital representation is transmitted from linear ADC array 171 to processor 172 for signal recovery. Processor 172 obtains a representation of the analog signal based on the digital representation and the mixing matrix. Processor 172 may be any suitable processing unit capable of signal recovery, determining a modulation format, and/or demodulating a digital signal based on a demodulation format, e.g., a dedicated circuit, a computer, and may be configured to run a program for signal recovery, determining a modulation format, and/or demodulating a digital signal based on a demodulation format in suitable software, e.g., Matlab® (The MathWorks, Inc., Natick, Mass.) or Mathematica® (Wolfram Research, Champaign, Ill.). Processor 172 may obtain the representation of the received signal using known techniques in the art of signal recovery and digital demodulation.

Device 100 may sample the received signal at a sampling rate at least M times greater than the sampling rate of an electronic ADC used in the device, where M is the number of channels in the spatial light modulator. For example, a device using signal recovery processor 170 illustrated in FIG. 7 would be able to sample a received signal at a rate at least eight times greater than the sampling rate of each ADC in ADC array 171. As a result, wideband signals may be converted into digital signals at signal recovery processor 170 using, for example, commercially available, low cost, low data rate (e.g., less than 500 Megasamples/second), low power (e.g., less than 0.1 picojoules per conversion step), ADCs.

Device 100 may include a display unit configured to display the representation of the received signal based on the digital representation and the mixing matrix. The display unit may be any device capable of displaying a signal representation.

Device 100 may be used to obtain a representation of a received signal, including wideband signals, in applications including, but not limited to, electronic warfare, radar, cognitive radio, signals intelligence, telecommunications, and signal sampling in space.

Figure 8:
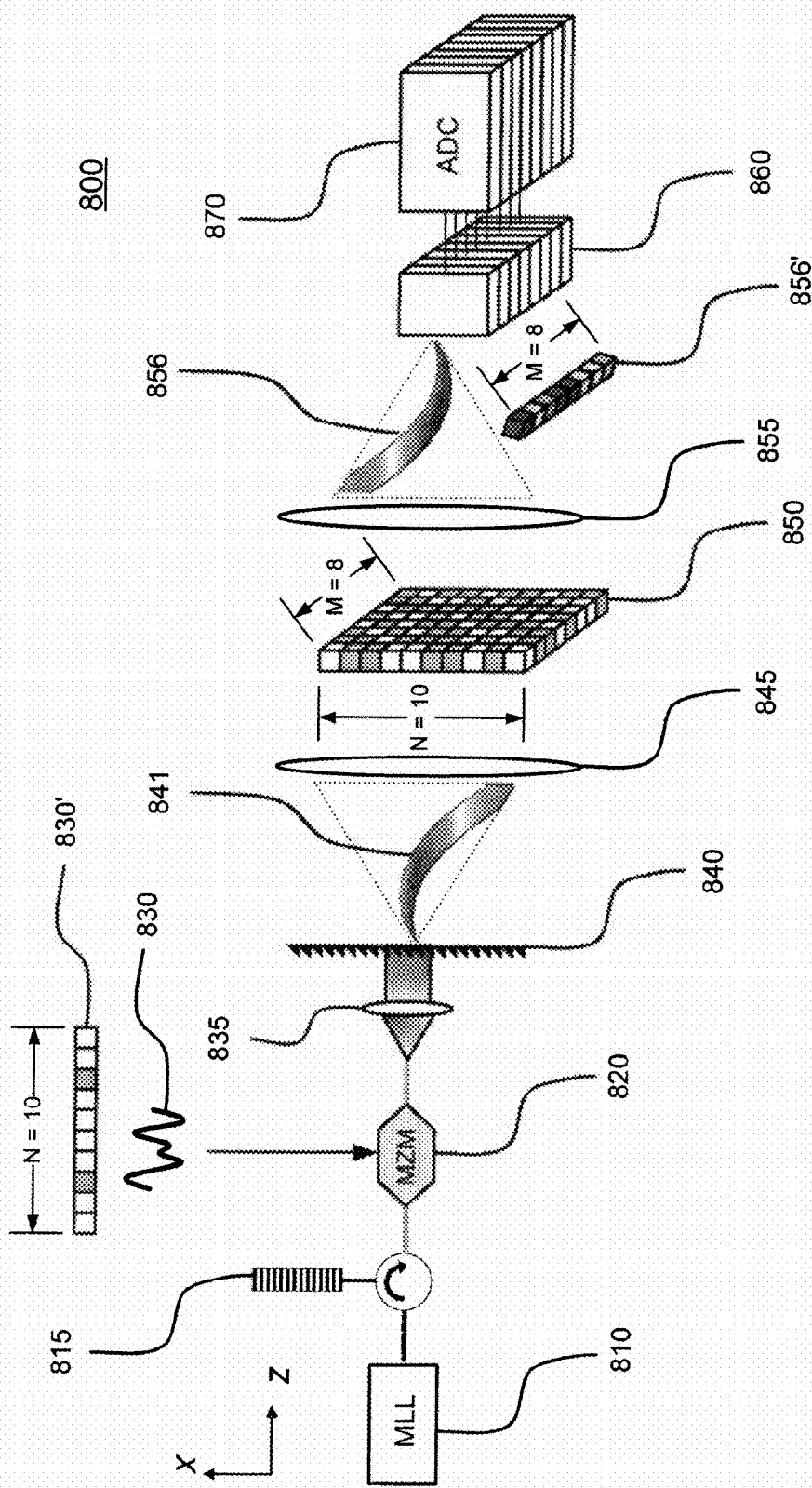
FIG. 8 illustrates an exemplary apparatus for obtaining a representation of an analog signal.

FIG. 8 illustrates an exemplary apparatus 800 for obtaining a representation of an RF signal, which in the illustrated embodiment is an analog signal, although the embodiment may also be used to obtain a representation of an RF digital signal. Apparatus 800 includes mode-locked laser (MLL) 810, chirped fiber Bragg grating (FBG) 815, Mach-Zehnder modulator (MZM) 820 which receives analog signal 830, transmissive diffraction grating 840, spatial light modulator (SLM) 850, linear photodiode array 860, and linear ADC array 870. Mode-locked laser (MLL) 810 generates an optical pulse, which is in some embodiments time-bandwidth limited, and chirped FBG 815 chirps the optical pulse. As discussed above with respect to FIGS. 2A-2D, the optical pulse may be linearly or nonlinearly chirped, and may be positively or negatively chirped. Chirped FBG 815 further may be calibrated to eliminate any detected timing errors.

The chirped optical pulse travels via fiber from chirped FBG 815 to MZM 820, which imposes RF signal 830 on the chirped repetitively pulsed optical signal by modulating the intensity of the chirped repetitively pulsed optical signal in accordance with temporal and frequency characteristics of analog signal 830. Analog signal 830 may be generated by a remote apparatus and received by MZM 820 using any suitable means. Analog signal 830' is a representation of analog signal 830 in vector form having dimension N×1. In this example, N equals ten. Analog signal 830' is sparse, as represented by eight white squares and two gray squares, because the signal contains a small number of significant frequencies (gray squares) relative to the band limit (N).

The modulated chirped repetitively pulsed optical signal travels from MZM 820 through an optical fiber and spreads out after it exits the fiber but before it reaches lens 835. Lens 835 collimates the modulated chirped repetitively pulsed optical signal, such that the pulse is substantially collimated as it is incident on diffraction grating 840. Diffraction grating 840 spatially disperses the different optical frequencies in the modulated chirped repetitively pulsed optical signal such that wavelengths vary along the N dimension, but not along the M dimension (referred to as dispersed optical frequencies 841), where M is the number of channels/rows and N is the number of pixel columns in SLM 850. In this example, M equals eight and N equals ten. Dispersed optical frequencies 841 travel through lens 845 which performs a spatial Fourier transform on the dispersed optical frequencies in the plane of SLM 850.

SLM 850 imposes a mixing matrix on an optical intensity of dispersed optical frequencies 841. The mixing matrix reduces or prevents light transmission of random portions of dispersed optical frequencies 841, as represented by white boxes. Preferably, no column of pixels (N) is completely blocked. The mixing matrix may be adjusted and programmed using SLM 850. Mixed dispersed optical frequencies 856 then travel through lens 855, which focuses frequencies 856 onto linear photodiode array 860. Lens 855 may be, for example, a cylindrical lens; in other embodiments, lens 855 may be replaced with another suitable optical component performing an analogous function, such as a grating, or an integrated optic component, e.g., an AWG. When analog signal 830', in the illustrated embodiment a vector of dimension 10×1, is multiplied by the mixing matrix (an 8×10 matrix), a vector of mixed dispersed optical frequencies 856' having dimension 8×1 are obtained. Mixed dispersed optical frequencies 856 are a compressed version of dispersed optical frequencies 841. For example, the highest box, M=1, of mixed dispersed optical frequencies 856' contains the entire dispersed optical frequencies 841 from the highest channel, M=1, of SLM 850 in compressed form. Unlike analog signal 830, which is sparse, mixed dispersed optical frequencies 856 are substantially all significant frequencies (represented by gray squares of varying shades). Further, mixed dispersed optical frequencies 856 are a useful representation of dispersed optical frequencies 841.

Lens 855 focuses mixed dispersed optical frequencies 856 onto linear photodiode array 860. There are eight photodiodes in linear photodiode array 860, and each photodiode receives the corresponding portion of mixed dispersed optical frequencies 856 to generate an electrical representation based on the intensity of the light in frequencies 856. For example, the highest box, M=1, of mixed dispersed optical frequencies 856' is focused on the highest photodiode, M=1, on linear photodiode array 860. Each photodiode integrates the corresponding mixed dispersed optical frequencies in time so as to obtain the electrical representation. The electrical representation travels to the corresponding one of eight ADCs in linear ADC array 870 where the electrical representation is converted from an analog representation to a digital representation. Because apparatus 800 may sample the received signal at a sampling rate at least M times greater than the sampling rate of each ADC in ADC array 870, analog signal 830 may be converted into digital signals at linear ADC array 870 using eight commercially available, low cost, low rate, low power ADCs. The digital representation may then be sent to signal recovery using a process known in the art in order to obtain a digital representation of analog signal 830.

Although the embodiments described above with respect to FIGS. 1-8 primarily utilize amplitude modulation of the chirped repetitively pulsed optical signal, phase modulation may also be used to impose a received signal onto the chirped repetitively pulsed optical signal. For example, optical modulator 120 may be a suitable phase modulator configured to impose an analog signal on the chirped repetitively pulsed optical signal. In this embodiment, the chirped repetitively pulsed optical signal may be divided into a first portion and a second portion after being generated by chirped optical source 110. The first portion travels to the phase modulator while the second portion travels to a splitter. The splitter is configured to split the second portion of the chirped repetitively pulsed optical signal based on a mixing matrix. The second portion is split into M signals, where M is the number of channels in spatial light modulator 150 and a dimension in the mixing matrix. The splitter then transmits the split second portion of the chirped repetitively pulsed optical signal to interfere with the mixed dispersed optical frequencies of the first portion from spatial light modulator 150.

The phase modulator receives the first portion of the chirped repetitively pulsed optical signal. Electrodes are positioned within the phase modulator and are coupled to a voltage generator. The voltage generator may be programmed to independently apply voltages to the electrodes so as to change the phase of the first portion of the chirped repetitively pulsed optical signal traveling through the phase modulator. For example, the voltage generator may apply voltages proportional to the analog signal generated by signal generator 130 and received by an analog signal receiver. The signal receiver may be operatively coupled to the voltage generator and may be any structure capable of receiving an analog signal, e.g., an antenna. The output of the phase modulator is the analog signal imposed on the first portion of the chirped repetitively pulsed optical signal, referred to as the modulated chirped repetitively pulsed optical signal.

Figure 9:
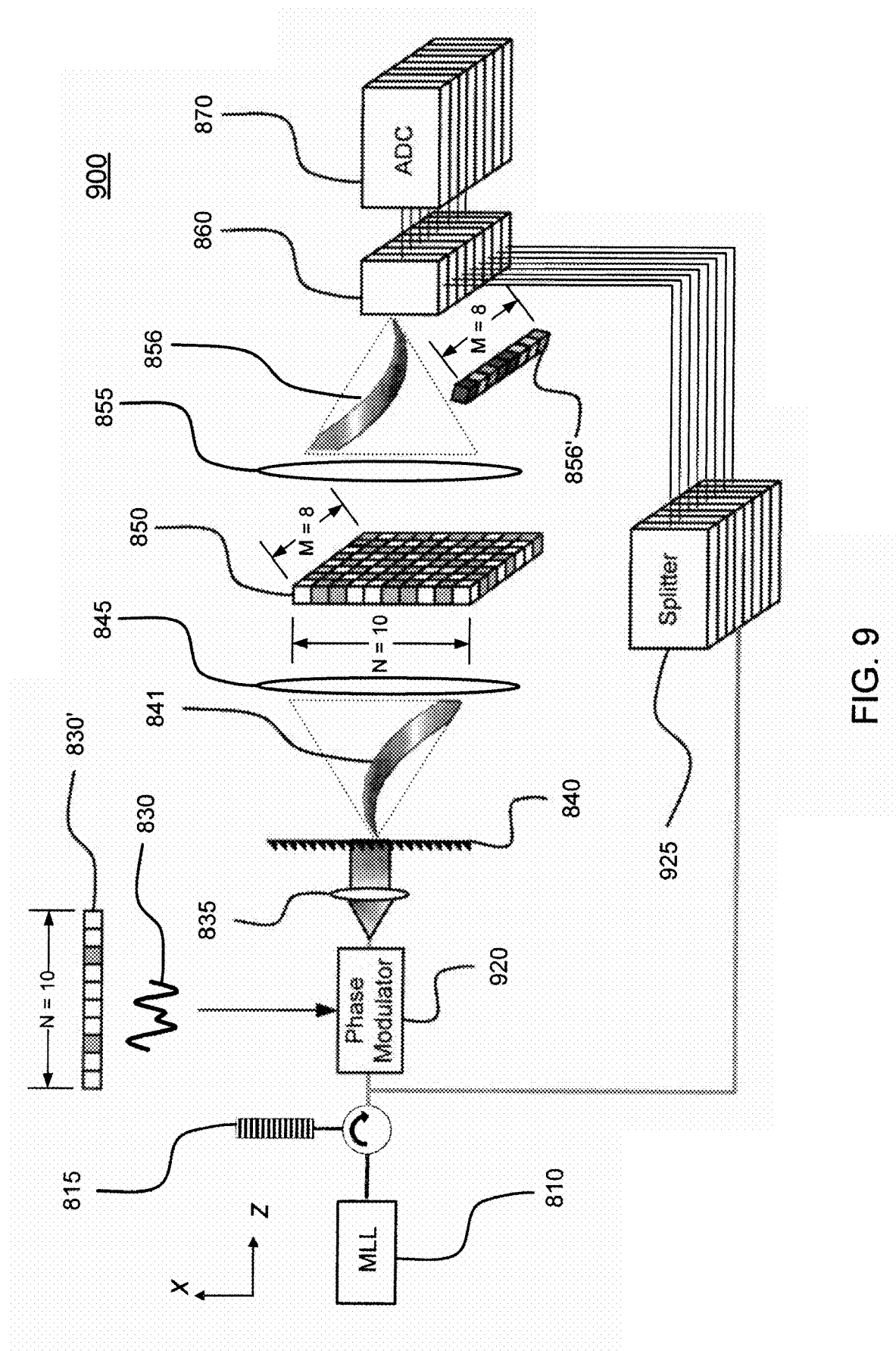
FIG. 9 illustrates an exemplary apparatus for obtaining a representation of an analog signal that is a variation of the apparatus from FIG. 8.

FIG. 9 illustrates an exemplary apparatus 900 for obtaining a representation of an analog signal that is a phase-modulating variation of apparatus 800 from FIG. 8. Apparatus 900 is similar to apparatus 800 except apparatus 900 includes phase modulator 920 in place of MZM 820 and further includes splitter array 925. Phase modulator 920 is configured to impose an analog signal on the chirped repetitively pulsed optical signal from chirped FBG 815. The chirped repetitively pulsed optical signal is divided into a first portion and a second portion, the first portion travels to phase modulator 920 while the second portion travels to splitter array 925. Splitter array 925 is configured to split the second portion of the chirped repetitively pulsed optical signal based on the mixing matrix, e.g., an 8×10 mixing matrix, in SLM 850. There are eight splitters in splitter array 925, each of which sends the split second portion to a corresponding photodiode. For example, the highest splitter, M=1, of splitter array 925 transmits the split second portion of the chirped repetitively pulsed optical signal to the highest photodiode, M=1, of linear photodiode array 860. The split second portion of the chirped repetitively pulsed optical signal interferes with mixed dispersed optical frequencies 856 of the first portion of the chirped repetitively pulsed optical signal at linear photodiode array 860.

In some embodiments, spatial light modulator 150 may be used to adjust the mixing matrix. The mixing matrix may be adjusted, for example, between chirped repetitively pulsed optical signals. Increasing the number of mixing matrices may increase the resolution of the representation of the received signal obtained by device 100. Spatial light modulator 150 may be used to bin the pixels together to vary the bandwidth of the received signal. Spatial light modulator 150 may adjust the number of channels (M), the number of pixel columns (N), and/or the number of pixels utilized in the mixing relative to the bandwidth of the received signal.

Optical Digital Signal

Figure 10:
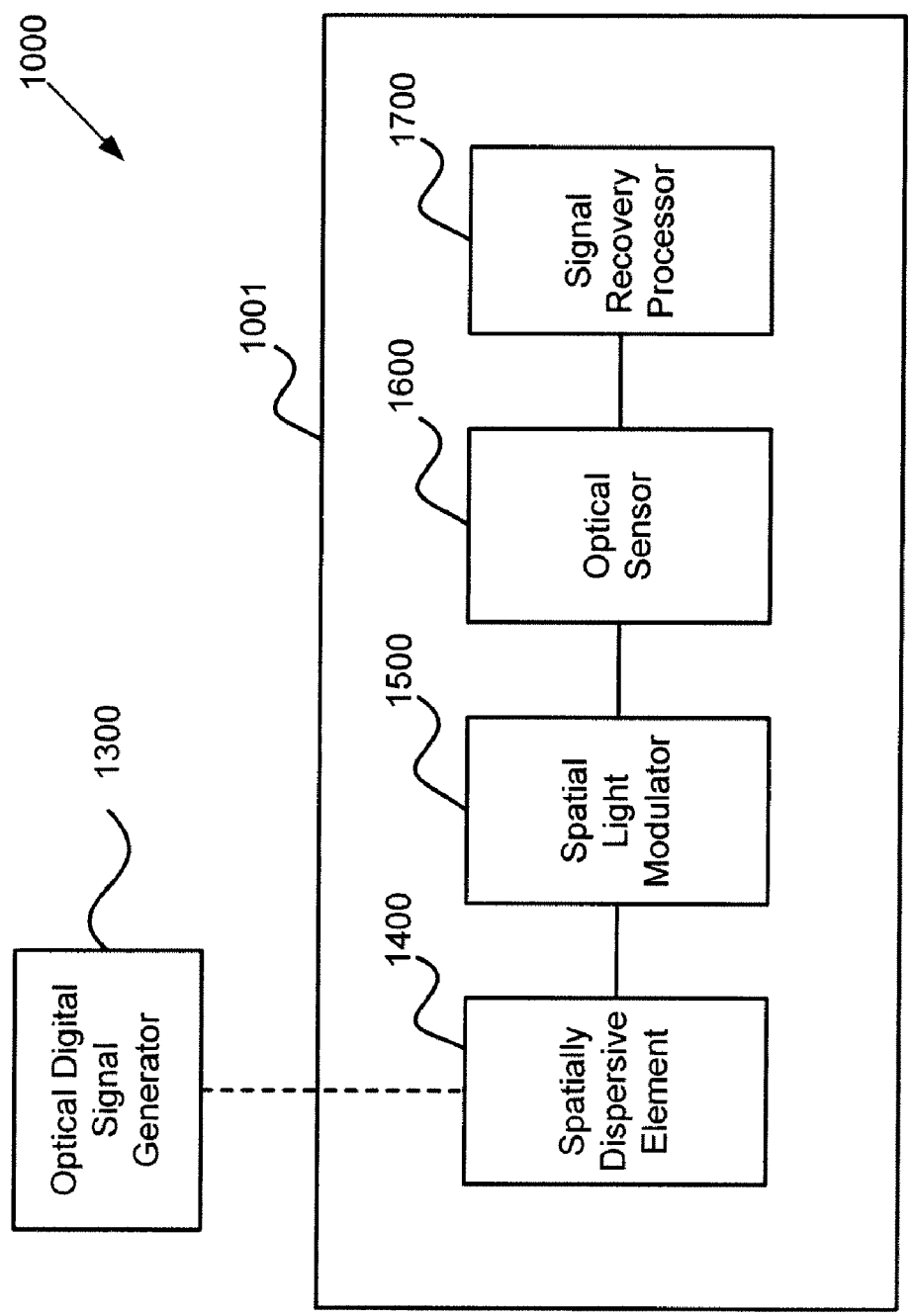
FIG. 10 schematically illustrates an exemplary device for obtaining a representation of an optical digital signal in the optical domain, according to some embodiments of the present invention.

FIG. 10 schematically illustrates exemplary device 1000 for obtaining an electronic digital representation of an optical digital signal using optical-domain processing, according to some embodiments of the present invention. Device 1000 may be used for direct digital demodulation, i.e., converting an optical digital signal into an electronic digital signal. Device 1000 includes spatially dispersive element 1400, spatial light modulator 1500, optical sensor 1600, and signal recovery processor 1700. In some embodiments, device 1000 includes housing 1001 configured to hold at least spatially dispersive element 1400, spatial light modulator 1500, optical sensor 1600, and signal recovery processor 1700 as illustrated in FIG. 10. In other embodiments, device 1000 includes more than one housing (not shown), each housing configured to hold at least one structure in device 1000.

Optical digital signal generator 1300 may generate an optical digital signal, such as an optical time division multiplexed signal. The modulation characteristics of the optical digital signal may be unknown. Optical digital signal generator 1300 may be remote from device 1000 and coupled to device 1000 using any suitable means, e.g., a fiber optic cable.

Figure 11:
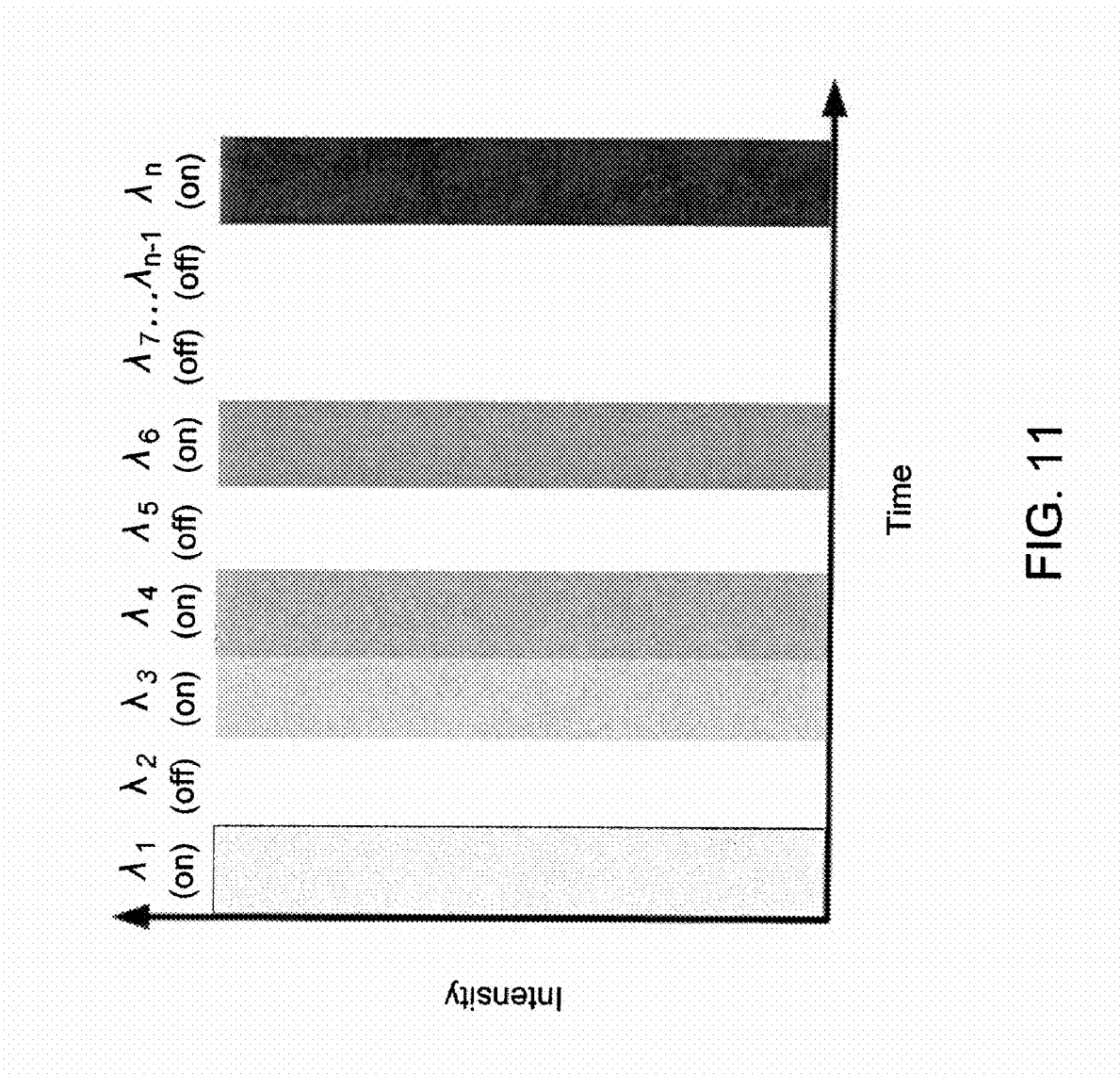
FIG. 11 is a plot illustrating a temporal intensity profile of an exemplary optical digital signal.

FIG. 11 is a plot illustrating a temporal intensity profile of an exemplary optical digital signal. The optical digital signal has n sequential pulses each at a different wavelength and each carrying an independent data stream as a function of time. The shorter wavelengths are represented by light gray and the longer wavelength frequencies are represented by dark gray. In this example, $\lambda_n > \lambda_{n-1} > \ldots > \lambda_7 > \lambda_6 > \lambda_5 > \lambda_4 > \lambda_3 > \lambda_2 > \lambda_1$ and the modulation format of the signal is on/off keying as represented by pulses $\lambda_1$, $\lambda_3$, $\lambda_4$, $\lambda_6$, and $\lambda_n$ being on and $\lambda_2$, $\lambda_5$, $\lambda_7$, and $\lambda_{n-1}$ being off. Although not shown in this example, the wavelengths of the sequential pulses may vary in time based on the optical digital signal.

Referring back to FIG. 10, after the optical digital signal is generated by optical digital signal generator 1300, the optical digital signal is received by device 1000, for example by connecting a fiber optic cable from digital signal generator 1300 to device 1000, e.g., to spatially dispersive element 1400. In some embodiments, optical signal receiver 1300 is disposed on device 1000, e.g., a fiber optic cable port disposed on device 1000. In other embodiments, the optical digital signal receiver is disposed outside of device 1000 and operatively coupled to device 1000 such that the optical digital signal may be transmitted to spatially dispersive element 1400. Spatially dispersive element 1400 may spatially disperse frequencies in the received signal and may operate in substantially the same manner as spatially dispersive element 140 of FIG. 1.

Figure 12:
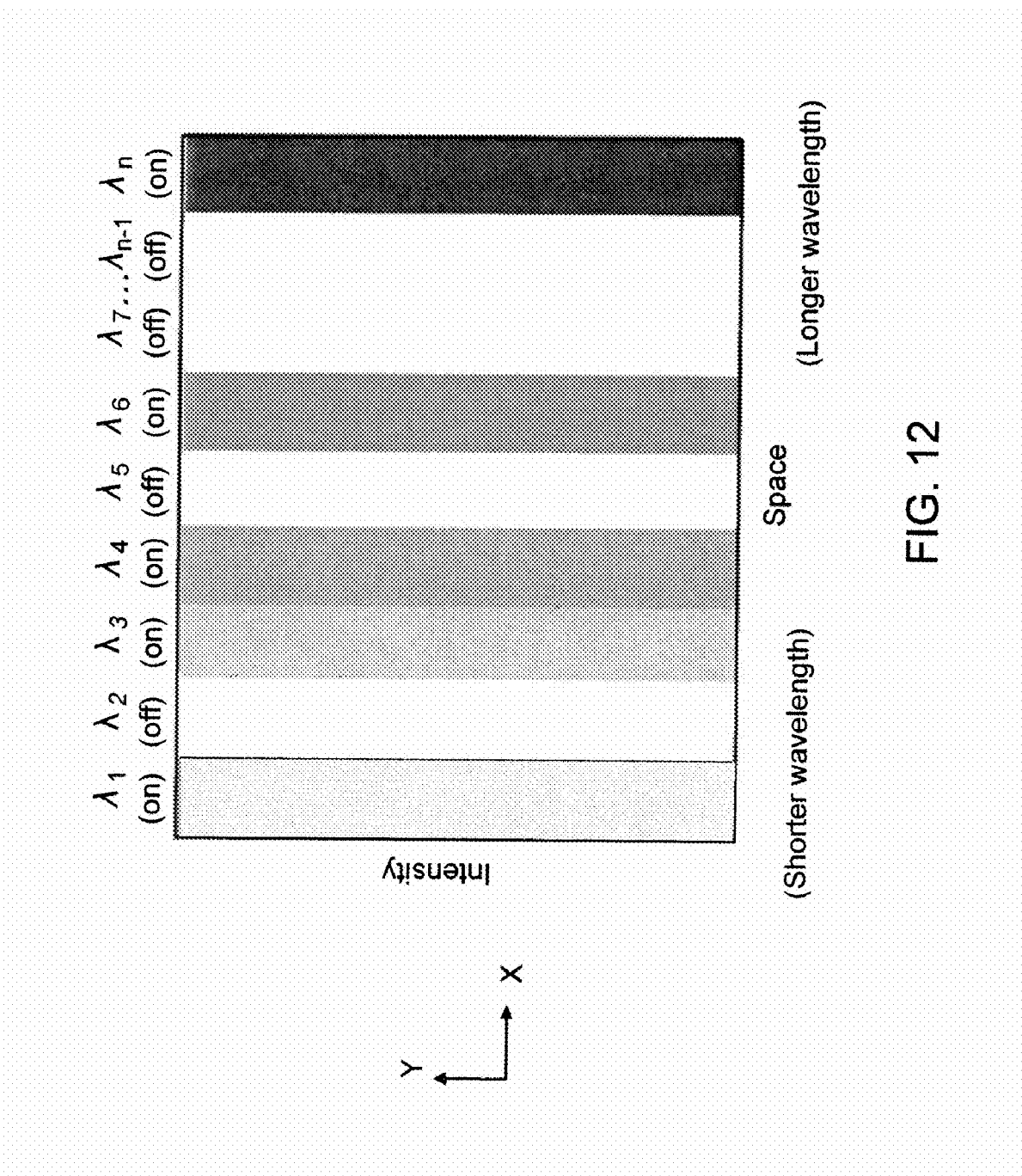
FIG. 12 illustrates exemplary dispersed optical frequencies in the optical digital signal of FIG. 11 after traveling through a spatially dispersive element.

FIG. 12 illustrates exemplary dispersed optical frequencies in the optical digital signal of FIG. 11 after traveling through or reflecting from spatially dispersive element 1400. The frequencies are dispersed such that shorter wavelength frequencies, represented by light gray, are disposed on one end of the dispersed signal relative to the x-axis, and the wavelength of the frequencies increases along the x-axis up to longer wavelength frequencies, represented by dark gray. In this example, the pulses are ordered $\lambda_n > \lambda_{n-1} > \ldots > \lambda_7 > \lambda_6 > \lambda_5 > \lambda_4 > \lambda_3 > \lambda_2 > \lambda_1$. The wavelength of the dispersed signal remains uniform relative to the y-axis.

Referring back to FIG. 10, spatial light modulator 1500 may mix the dispersed optical frequencies by imposing a mixing matrix on an optical intensity of the dispersed optical frequencies. Spatial light modulator 1500 may operate in substantially the same manner as spatial light modulator 150 of FIG. 1.

Optical sensor 1600 may obtain an electrical representation of the mixed dispersed optical frequencies. Optical sensor 1600 may operate in substantially the same manner as optical sensor 160 of FIG. 1.

Signal recovery processor 1700 may obtain a digital representation of the received signal based on the electrical representation and the mixing matrix. Further, signal recovery processor 1700 may determine a modulation format of the digital representation and may demodulate the digital representation based on the modulation format. Signal recovery processor 1700 may operate in substantially the same manner as signal recovery processor 170 of FIG. 1. Non-limiting examples of digital modulation formats include phase-shift keying, binary phase modulation, frequency-shift keying, amplitude shift-keying, on/off keying, quadrature amplitude modulation, continuous phase modulation, orthogonal frequency-division multiplexing modulation, wavelet modulation, Trellis coded modulation, direct-sequence spread spectrum, chirp spread spectrum, frequency-hopping spread spectrum, and pulse position modulation.

Figure 13:
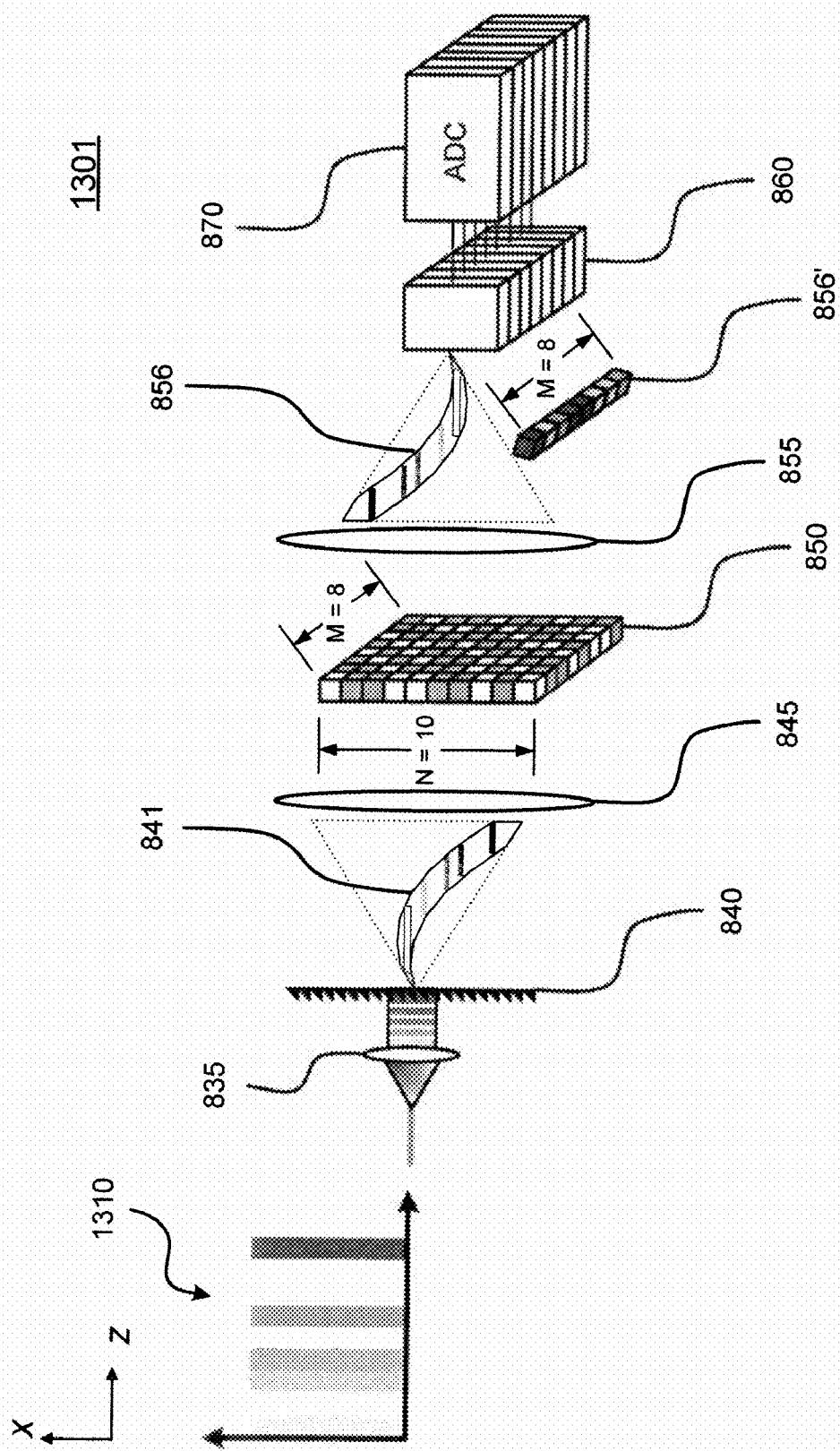
FIG. 13 illustrates an exemplary apparatus for obtaining a representation of an optical digital signal.

FIG. 13 illustrates an exemplary apparatus 1301 for obtaining a representation of an optical digital signal that is a variation of apparatus 800 from FIG. 8. Apparatus 1301 is similar to apparatus 800 except apparatus 1301 includes input optical digital signal 1310 and does not include mode-locked laser 810, chirped FBG 815, or MZM 820 which receives analog signal 830. Optical digital signal 1310 may be a signal that resides on a periodically chirped optical carrier, e.g., an optical time division multiplexed signal.

Method

Figure 14:
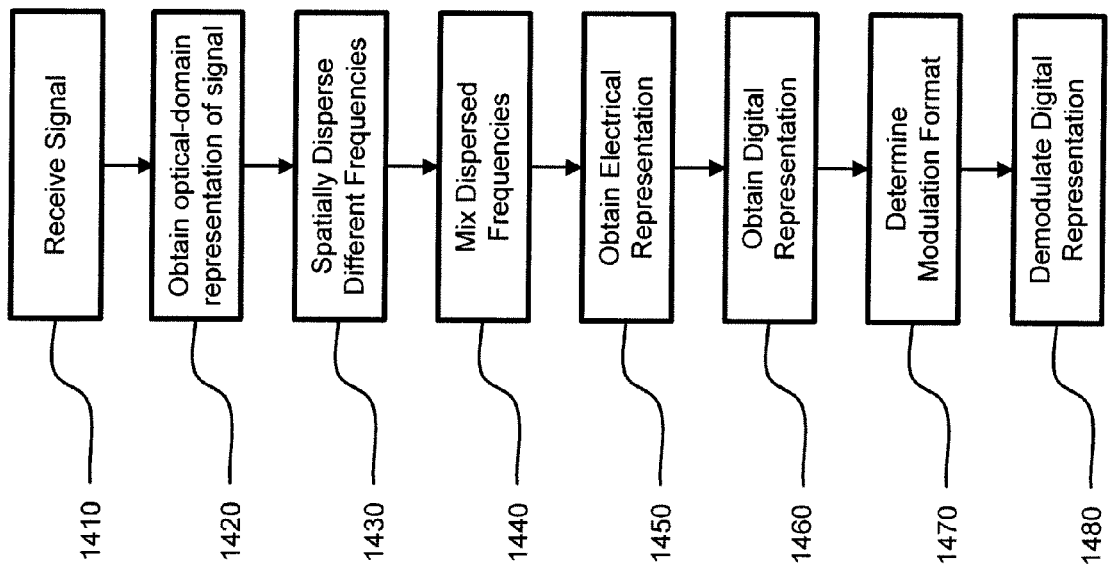
FIG. 14 illustrates an exemplary method for obtaining a representation of a signal, according to some embodiments of the present invention.

FIG. 14 illustrates an exemplary method 1401 for obtaining a representation of a signal, according to some embodiments of the present invention. First, at step 1410, a signal is received. The signal may be a radio-frequency signal, which may be analog or digital, or an optical digital signal, and may reside on a periodically chirped optical carrier. The signal may be received in a manner discussed above with respect to FIG. 1 and FIG. 10, for example.

Next, at step 1420, an optical-domain representation of the received signal is obtained. For example, as described above with reference to FIGS. 1 and 9, the received signal may be an RF signal that may be imposed on a periodically chirped optical carrier, e.g., in the form of an intensity modulation or a phase modulation of the carrier. Such a modulation of the optical carrier may be considered to provide an optical-domain representation of the received signal. Or, for example, as described above with reference to FIG. 10, the received signal may be an optical digital signal. In such an embodiment, the received signal is already in the optical domain and may be used "as is," in which case no action need be taken to obtain an optical-domain representation of the received signal.

Next, at step 1430, different frequencies in the optical-domain representation of the signal are spatially dispersed. The spatially dispersing may include producing a time/wavelength to space mapping of the optical-domain representation. The different frequencies may be dispersed up to the size of the corresponding spatial light modulator for mixing. In some embodiments, the spatially dispersing includes using diffraction grating or a prism.

Then, at step 1430, the dispersed optical frequencies are mixed. The mixing may include imposing a mixing matrix on an optical intensity of the dispersed optical frequencies. For example, as discussed above with respect to FIGS. 6A-6B, a spatial light modulator of size M×N may be used to impose a mixing matrix. The spatial light modulator may have M channels and N pixel columns defining individual pixels that may be independently adjustable so as to select a particular mixing matrix and to prevent or reduce light transmission of different portions of the dispersed optical frequencies. The mixing preferably is performed so as to avoid blocking an entire column of pixels (N) at one time. The mixing may include programming and/or reprogramming the pixels so as to alter the mixing matrix. In some embodiments, the mixing includes using a spatial light modulator.

Then, at step 1440, an electrical representation of the mixed dispersed optical frequencies is obtained. The mixed dispersed optical frequencies may be converted from light to current/voltage to obtain the electrical representation. Obtaining the electrical representation may include integrating the mixed dispersed optical frequencies in time. Further, obtaining the electrical representation may include low-pass filtering the mixed dispersed optical frequencies. In some embodiments, obtaining an electrical representation includes using a photodiode. In some embodiments, an array of photodiodes, e.g., an array of M×1 photodiodes, are used corresponding to the number of channels (M) in the spatial light modulator.

Next, at step 1450, a digital representation of the originally received signal is obtained based on the electrical representation and the mixing matrix. Step 1450 may include converting the electrical representation from an analog representation (e.g., a signal produced by the optical sensor) into a digital representation (e.g., using an ADC), and recovering a digital representation of the signal based on the digital representation from the ADC and the mixing matrix. In some embodiments, obtaining the digital representation includes storing the digital representation of the signal in a memory device. In some embodiments, an array of ADCs, e.g., an array of M×1 ADCs, are used corresponding to the number of channels (M) in the spatial light modulator. The processing may include using a dedicated circuit or a computer. The processing may include running a suitable program for signal recovery in software such as Matlab® (The MathWorks, Inc., Natick, Mass.) or Mathematica® (Wolfram Research, Champaign, Ill.). Once the digital representation of the signal is obtained, the representation may be suitably analyzed.

Method 1401 may further include, at step 1460, determining a modulation format of the digital representation. The modulation format may be determined, for example, using suitable computer software. Non-limiting examples of modulation formats include amplitude modulation, double-sideband modulation, single-sideband modulation, vestigial sideband modulation, quadrature amplitude modulation, angle modulation, frequency modulation, phase modulation, phase-shift keying, binary phase modulation, frequency-shift keying, amplitude shift-keying, on/off keying, continuous phase modulation, orthogonal frequency-division multiplexing modulation, wavelet modulation, Trellis coded modulation, direct-sequence spread spectrum, chirp spread spectrum, frequency-hopping spread spectrum, and pulse position modulation. Previously-known demodulation techniques may require prior knowledge of the type of modulation used to encode a signal; for example, previously-known demodulation phase-shift keying may require the use of an interferometer to determine the phase of incoming optical pulses. By contrast, aspects of the present invention instead provide a digitized representation of the received signal to suitable software that may be configured to determine the particular type of modulation being used to encode a signal, thus providing substantially more flexibility than previously-known demodulators.

Then, at step 1470, the digital representation may be demodulated based on the modulation format using, e.g., suitable computer software. In some embodiments, determining the modulation format and demodulating the determined modulation format may occur after converting the electrical representation of the mixed dispersed optical frequencies into a digital representation. As such, the received signal may be digitized and then demodulated with, for example, suitable high speed digital demodulation software.

Method 1401 may further include displaying the digital representation of the received signal to a user, e.g., using a suitable display device, such as an LCD or LED display.

In some embodiments, a chirped repetitively pulsed optical signal is generated. As discussed with respect to FIG. 1, generating the chirped repetitively pulsed optical signal may include using a laser configured to generate a suitable optical pulse, e.g., a mode-locked laser, fiber laser, titanium-doped sapphire (Ti:Sapphire) solid-state laser, or dye laser. Generating the chirped repetitively pulsed optical signal may include chirping the pulse generated by the laser, e.g., using a grating, a fiber Bragg grating (FBG), dispersion compensating fiber (DCF), or standard optical fiber. Generating the chirped repetitively pulsed optical signal may further include calibrating the grating to eliminate timing errors in the chirped repetitively pulsed optical signal.

In some embodiments, the chirped repetitively pulsed optical signal is modulated. The modulation includes imposing an analog signal on the chirped repetitively pulsed optical signal. Modulating the chirped repetitively pulsed optical signal may include receiving an analog signal that is generated by a remote source. Once the analog signal is received, it may be imposed on the chirped repetitively pulsed optical signal using a modulator such as an intensity modulator, e.g., MZM such as described above, or a phase modulator such as described below. The modulating of the chirped repetitively pulsed optical signal may result in the modulated chirped repetitively pulsed optical signal having varying intensities over time based on the imposed analog signal. Further, the modulated chirped repetitively pulsed optical signal may have varying wavelengths over time based on how the chirped repetitively pulsed optical signal was generated.

Examples

The functionality of devices 100, 1000 and method 1401 for obtaining a representation of a received signal may be illustrated by way of Examples, which were numerically calculated using Mathematica® (Wolfram Research, Champaign, Ill.). FIG. 15A is a plot illustrating the intensity of a simulated analog radio-frequency signal, e.g., a signal received by system 100 illustrated in FIG. 1. In FIGS. 15A-17B, time is normalized to one period of operation of device 100, e.g., the temporal spacing between $t_2$ and $t_1$ illustrated in FIG. 2A.

FIG. 15B is three plots illustrating the intensity of three signals over normalized time after simulated transmission through separate channels of a mixing matrix. The mixing matrix included randomly placed squares with light transmission coefficients of 1 (full transmission) and ½ (partial blockage). In this Example, spatial light modulator 150 included an equal number of channels (M) and columns of pixels (N).

FIG. 15C is a plot illustrating the simulated digital representation of the analog signal of FIG. 15A as digitized by device 100. The simulated digital signal of FIG. 15C was calculated at optical sensor 160 by integrating the signals of FIG. 15B over the period of operation for each of the channels (M) of spatial light modulator 150, digitized using low-rate ADCs, and then, because M=N, multiplying this M-dimensional vector by the inverse of the mixing matrix.

Figure 15D:
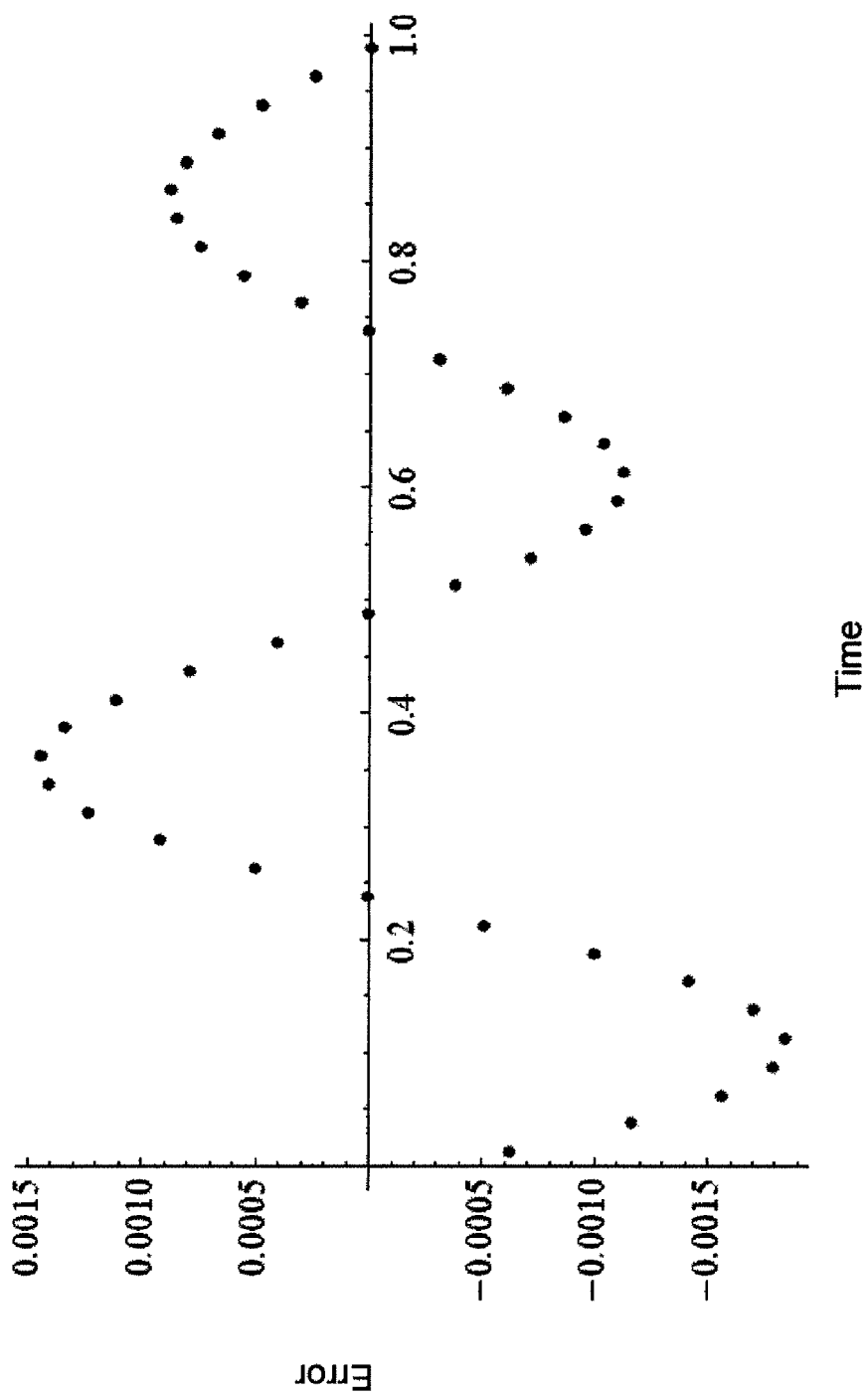
FIG. 15D is a plot illustrating the difference between the signal intensity of the digital representation in FIG. 15C and the signal intensity of the analog signal of FIG. 15A.

FIG. 15D is a plot illustrating the difference, referred to as error, between the simulated signal intensity of the digital representation in FIG. 15C and the simulated signal as input to device 100. As can be seen from FIG. 15D, the simulated digital representation obtained using system 100 includes significantly more data points than the simulated signal as input to the device.

Figure 16A:
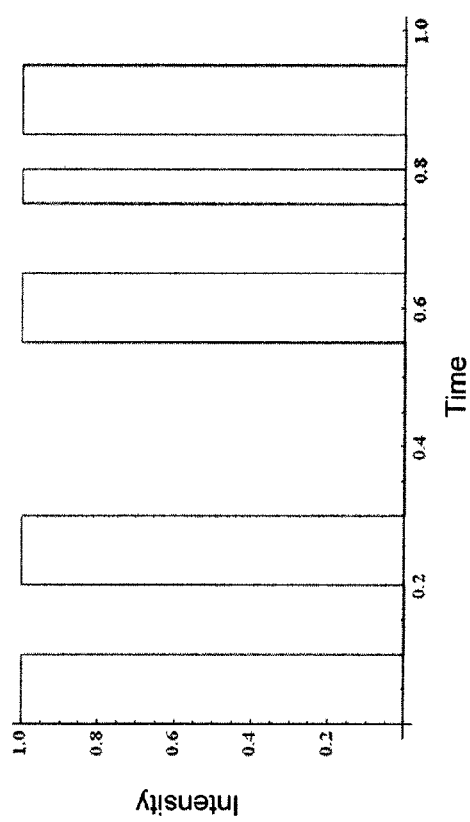
FIG. 16A is a plot illustrating the intensity of an exemplary square-wave radio-frequency signal as input to the device.

FIG. 16A is a plot illustrating the simulated intensity of an exemplary square-wave (digital) radio-frequency signal over time, e.g., a signal received by device 100 illustrated in FIG. 1. This Example illustrates a signal employing on/off keying modulation over several periods of a time-division multiplexed signal (TDM). The digitization of the signal using device 100 was simulated. The period of device 100 was set to an integral number of communications bits and aligned with the communications bits using a simulated optical delay line. The digital signal was calculated by integrating the simulated signals from channels (M) of spatial light modulator 150 over the period of operation for each of the channels (M) and then, because M=N, multiplying this M-dimensional vector by the inverse of the mixing matrix.

Figure 16B:
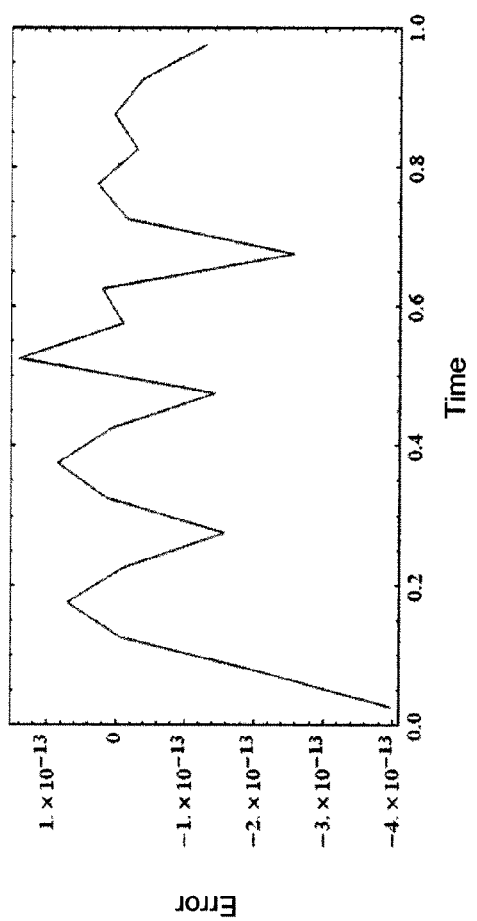
FIG. 16B is a plot illustrating the difference between the signal intensity of the digital representation of the received signal as digitized by the device and the signal intensity of the signal of FIG. 16A.

FIG. 16B is a plot illustrating the difference, referred to as error, between the signal intensity of the simulated digital representation of the received signal as digitized by device 100, and the simulated digital representation of the received signal as digitized as input to device 100. As may be seen in FIG. 16B, the error is relatively small, between approximately $1\times10^{-13}$ and $-4\times10^{-13}$.

Figure 17A:
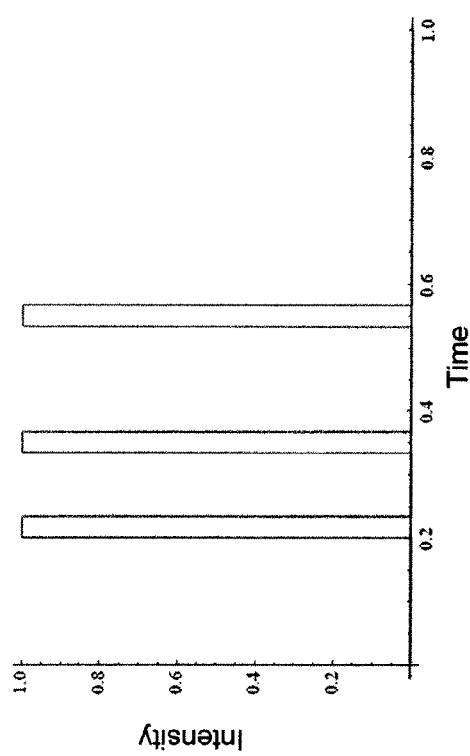
FIG. 17A is a plot illustrating the intensity of an exemplary sparse square-wave radio-frequency signal as input to the device.

FIG. 17A is a plot illustrating the simulated intensity of an exemplary optical digital signal over time, e.g., a signal received by device 1000 illustrated in FIG. 10. In this Example, the signal was sparse, as illustrated by the presence of only 3 non-zero pulses in the signal. An example of a sparse signal is a signal used in high order pulse position modulation. The digitization of the sparse signal was simulated. The digital signal was calculated at optical sensor 160 by integrating the simulated signals from channels (M) of spatial light modulator 150 over the period of operation for each of the channels (M). In this example, M≠N (M was 30 and N was 10), so the mixing matrix did not have an inverse; therefore signal recovery proceeded to a processor configured to run a program for signal recovery for compressing sensing in suitable software, e.g., Matlab® (The MathWorks, Inc., Natick, Mass.) or Mathematica® (Wolfram Research, Champaign, Ill.). Specifically, the L1Packv2 Mathematica® package disclosed by Loris was used.

Figure 17B:
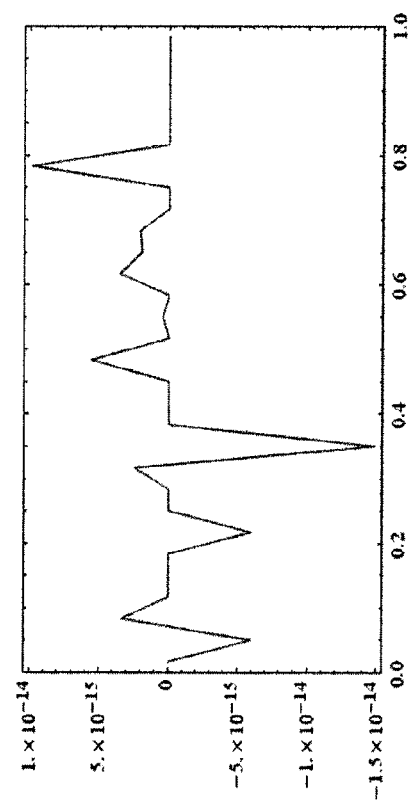
FIG. 17B is a plot illustrating the difference between the signal intensity of the digital representation of the received sparse signal as digitized by the device and the signal intensity of the sparse signal of FIG. 17A.

FIG. 17B is a plot illustrating the difference, referred to as error, between the simulated signal intensity of the digital representation of the received sparse signal as digitized by device 1000 and the simulated signal intensity of the sparse signal of FIG. 17A as input to device 1000. As may be seen in FIG. 17B, the error is relatively small, between approximately $1\times10^{-14}$ and $-1.5\times10^{-14}$.

Alternative Embodiments

While preferred embodiments of the invention are described herein, it will be apparent to one skilled in the art that various changes and modifications may be made. The appended claims are intended to cover all such changes and modifications that fall within the true spirit and scope of the invention.

What is claimed:

1. A device for obtaining a digital representation of a received signal, the device comprising:
a spatially dispersive element configured to spatially disperse optical frequencies in an optical-domain representation of the received signal;
a spatial light modulator configured to mix the dispersed optical frequencies by imposing a mixing matrix on an optical intensity of the dispersed optical frequencies;
an optical sensor configured to obtain an electrical representation of the mixed dispersed optical frequencies; and
a signal recovery processor configured to obtain a digital representation of the received signal based on the electrical representation and the mixing matrix.

2. The device of claim 1, wherein the signal recovery processor is further configured to determine a modulation format of the digital representation.

3. The device of claim 2, wherein the signal recovery processor is further configured to demodulate the digital representation based on the modulation format.

4. The device of claim 1, wherein the received signal comprises an optical digital signal.

5. The device of claim 1, wherein the received signal comprises an analog radio-frequency signal.

6. The device of claim 5, further comprising a chirped optical source configured to generate a chirped repetitively pulsed optical signal and an optical modulator configured to impose the analog radio-frequency signal on the chirped repetitively pulsed optical signal.

7. The device of claim 6, wherein the chirped optical source comprises a laser.

8. The device of claim 6, wherein the chirped optical source comprises a dispersive optical element.

9. The device of claim 5, further comprising an analog signal receiver operatively coupled to the optical modulator, the analog signal receiver configured to receive the analog radio-frequency signal.

10. The device of claim 6, wherein the optical modulator comprises an intensity modulator.

11. The device of claim 6, further comprising a splitter, wherein the optical modulator comprises a phase modulator and the chirped repetitively pulsed optical signal is divided into a first portion and a second portion, the first portion traveling to the phase modulator and the second portion traveling to the splitter,
the splitter configured to split the second portion of the chirped repetitively pulsed optical signal based on the mixing matrix and transmit the split second portion of the chirped repetitively pulsed optical signal to interfere with the mixed dispersed optical frequencies of the first portion of the chirped repetitively pulsed optical signal from the spatial light modulator.

12. The device of claim 1, wherein the spatially dispersive element comprises a diffraction grating.

13. The device of claim 1, wherein the spatially dispersive element comprises a wavelength division demultiplexer.

14. The device of claim 1, wherein the spatial light modulator comprises channels and columns of pixels, each pixel being independently adjustable.

15. The device of claim 1, wherein the optical sensor comprises an array of photodiodes.

16. The device of claim 1, wherein the signal recovery processor comprises an analog-to-digital converter.

17. The device of claim 1, further comprising a display unit configured to display the digital representation of the received signal.

18. A method for obtaining a digital representation of a received signal, the method comprising:
obtaining an optical-domain representation of the signal;

spatially dispersing optical frequencies in the optical-domain representation;

mixing the dispersed optical frequencies by imposing a mixing matrix on an optical intensity of the dispersed optical frequencies;

obtaining an electrical representation of the mixed dispersed optical frequencies; and obtaining a digital representation of the signal based on the electrical representation and the mixing matrix.

19. The method of claim 18, further comprising determining a modulation format of the digital representation.

20. The method of claim 19, further comprising demodulating the digital representation based on the modulation format.

* * * * *